US011106976B2

(12) United States Patent
Flamant

(10) Patent No.: US 11,106,976 B2
(45) Date of Patent: Aug. 31, 2021

(54) NEURAL NETWORK OUTPUT LAYER FOR MACHINE LEARNING

(71) Applicant: Wave Computing, Inc., Campbell, CA (US)

(72) Inventor: Sylvain Flamant, Saratoga, CA (US)

(73) Assignee: Wave Computing, Inc., San Jose, CA (US)

( * ) Notice: Subject to any disclaimer, the term of this patent is extended or adjusted under 35 U.S.C. 154(b) by 0 days.

(21) Appl. No.: 16/459,731

(22) Filed: Jul. 2, 2019

(65) Prior Publication Data

US 2019/0325309 A1    Oct. 24, 2019

Related U.S. Application Data

(63) Continuation-in-part of application No. 16/104,586, filed on Aug. 17, 2018, now abandoned.

(60) Provisional application No. 62/856,490, filed on Jun. 3, 2019, provisional application No. 62/850,059, filed on May 20, 2019, provisional application No. 62/827,333, filed on Apr. 1, 2019, provisional application No. 62/802,307, filed on Feb. 7, 2019, provisional application No. 62/800,432, filed on Feb.
(Continued)

(51) Int. Cl.
*G06N 3/08* (2006.01)
*G06F 17/16* (2006.01)
*G06F 16/901* (2019.01)

(52) U.S. Cl.
CPC ............. *G06N 3/08* (2013.01); *G06F 16/902* (2019.01); *G06F 17/16* (2013.01)

(58) Field of Classification Search
CPC ........ G06F 17/16; G06F 16/9024; G06N 3/08
See application file for complete search history.

(56) References Cited

U.S. PATENT DOCUMENTS 5,142,631 A    8/1992  Murray et al.
6,134,605 A   10/2000  Hudson et al.
(Continued)

FOREIGN PATENT DOCUMENTS

JP    2005165961 A    12/2003
WO   WO2009131569 A1  10/2009

OTHER PUBLICATIONS

International Search Report dated Feb. 6, 2015 for PCT/US2014/063591.
(Continued)

*Primary Examiner* — Zachary K Huson
(74) *Attorney, Agent, or Firm* — Fernandez & Associates, LLP

(57) ABSTRACT

Techniques for a neural network output layer for machine learning are disclosed. A plurality of processing elements within a reconfigurable fabric is configured to implement a data flow graph, where the data flow graph implements a neural network. The data flow graph can include machine learning or deep learning. A layer is implemented, within the neural network, that maps a first vector of real values to a second vector of real values bounded by zero and one, where the second vector sums to a value of one using fixed-point calculations. The layer can include a final layer within the neural network. The layer that maps the first vector includes a Softmax function. Results of the neural network are classified based on a value of the second vector. The classifying can include part of a machine learning or a deep learning process.

22 Claims, 16 Drawing Sheets

Related U.S. Application Data 2, 2019, provisional application No. 62/773,486, filed on Nov. 30, 2018, provisional application No. 62/694,984, filed on Jul. 7, 2018, provisional application No. 62/692,993, filed on Jul. 2, 2018, provisional application No. 62/679,046, filed on Jun. 1, 2018, provisional application No. 62/679,172, filed on Jun. 1, 2018, provisional application No. 62/650,425, filed on Mar. 30, 2018, provisional application No. 62/650,758, filed on Mar. 30, 2018, provisional application No. 62/637,614, filed on Mar. 2, 2018, provisional application No. 62/636,309, filed on Feb. 28, 2018, provisional application No. 62/611,600, filed on Dec. 29, 2017, provisional application No. 62/611,588, filed on Dec. 29, 2017, provisional application No. 62/594,563, filed on Dec. 5, 2017, provisional application No. 62/594,582, filed on Dec. 5, 2017, provisional application No. 62/579,616, filed on Oct. 31, 2017, provisional application No. 62/577,902, filed on Oct. 27, 2017, provisional application No. 62/547,769, filed on Aug. 19, 2017, provisional application No. 62/857,925, filed on Jun. 6, 2019.

(56) References Cited

U.S. PATENT DOCUMENTS

| | | |
|---|---|---|
| 6,363,470 B1 | 3/2002 | Laurenti et al. |
| 7,817,655 B1 | 10/2010 | Bennett et al. |
| 8,314,636 B2 | 11/2012 | Hutton et al. |
| 8,341,469 B2 | 12/2012 | Miyama et al. |
| 8,493,974 B1 | 7/2013 | Nelson et al. |
| 10,467,183 B2 | 11/2019 | Fleming |
| 2002/0167337 A1 | 11/2002 | Chelcea et al. |
| 2007/0133399 A1 | 6/2007 | Gangwal |
| 2008/0168303 A1 | 7/2008 | Spear et al. |
| 2009/0070552 A1 | 3/2009 | Kanstein et al. |
| 2009/0089605 A1 | 4/2009 | Westwick et al. |
| 2010/0013517 A1 | 1/2010 | Manohar et al. |
| 2010/0017774 A1 | 1/2010 | Bachina et al. |
| 2010/0281448 A1 | 11/2010 | He |
| 2010/0332755 A1 | 12/2010 | Bu et al. |
| 2011/0199117 A1 | 8/2011 | Hutchings et al. |
| 2012/0119781 A1 | 5/2012 | Manohar et al. |
| 2012/0235839 A1 | 9/2012 | Mazumdar et al. |
| 2012/0319730 A1 | 12/2012 | Fitton et al. |
| 2013/0009666 A1 | 1/2013 | Hutton et al. |
| 2013/0009667 A1 | 1/2013 | Calhoun et al. |
| 2013/0043902 A1 | 2/2013 | Rahim et al. |
| 2014/0075144 A1 | 3/2014 | Sanders et al. |
| 2015/0123707 A1 | 5/2015 | Nicol |
| 2015/0268963 A1 | 9/2015 | Etsion et al. |
| 2016/0350650 A1* | 12/2016 | Leeman-Munk ........ G06N 3/04 |
| 2017/0032285 A1 | 2/2017 | Sharma et al. |
| 2017/0061279 A1 | 3/2017 | Yang et al. |
| 2017/0140263 A1 | 5/2017 | Kaiser et al. |
| 2018/0032866 A1* | 2/2018 | Son ......................... G06N 3/04 |

OTHER PUBLICATIONS

Courbariaux, M., Bengio, Y., & David, J. R (2014). Training deep neural networks with low precision multiplications. arXiv preprint arXiv:1412.7024.

Ioffe, S., & Szegedy, C. (2015). Batch normalization: Accelerating deep network training by reducing internal covariate shift. arXiv preprint arXiv:1502.03167.

Gupta, S., Agrawal, A., Gopalakrishnan, K., & Narayanan, P. (Jun. 2015). Deep learning with limited numerical precision. In International Conference on Machine Learning (pp. 1737-1746).

Lai, L., Suda, N., & Chandra, V. (2017). Deep convolutional neural network inference with floating-point weights and fixed-point activation& arXiv preprint arXiv:1703.03073.

* cited by examiner

| 1/K | PARABOLIC ESTIMATE WITH 1 TABLE | PARABOLIC ESTIMATE WITH 3 TABLES |
|---|---|---|
| MEMORY | 34 X 3 BYTES | 3 X 256 X 2 BYTES |
| TABLE ACCESSES | 3 | 3 |
| MULT (24 X 16) | | |
| MULT (24 X 8) | 4 | |
| MULT (16 X 16) | | 2 |
| MULT (16 X 8) | | |
| ROUND (32 BITS) | | |
| ROUND (24 BITS) | | |
| ROUND (16 BITS) | 3 | 2 |
| ADDS (24 BITS) | 1 | 1 |
| ADDS (16 BITS) | 10 | 2 |
| ADDS (8 BITS) | 3 | |
| COMPARE (32 BITS) | | |
| COMPARE (24 BITS) | | |
| SHIFTS (32 BITS) | 4 | 2 |
| SHIFTS (16 BITS) | 2 | |
| SHIFTS (8 BITS) | | |

| 39750 | 42313 | 45042 | 47947 | 51039 | 54331 | 57835 | 61565 | 65535 |
|---|---|---|---|---|---|---|---|---|
| 22649 | 24109 | 25664 | 27319 | 29081 | 30957 | 32954 | 35079 | 37341 |
| 12905 | 13737 | 14623 | 15566 | 16570 | 17639 | 18776 | 19987 | 21276 |
| 7353 | 7827 | 8332 | 8869 | 9441 | 10050 | 10698 | 11388 | 12123 |
| 4190 | 4460 | 4747 | 5054 | 5380 | 5726 | 6096 | 6489 | 6907 |
| 2387 | 2541 | 2705 | 2879 | 3065 | 3263 | 3473 | 3697 | 3936 |
| 1360 | 1448 | 1541 | 1641 | 1746 | 1859 | 1979 | 2107 | 2243 |
| 775 | 825 | 878 | 935 | 995 | 1059 | 1128 | 1200 | 1278 |
| 442 | 470 | 500 | 533 | 567 | 604 | 642 | 684 | 728 |
| 252 | 268 | 285 | 303 | 323 | 344 | 366 | 390 | 415 |
| 143 | 153 | 162 | 173 | 184 | 196 | 209 | 222 | 236 |
| 82 | 87 | 93 | 99 | 105 | 112 | 119 | 127 | 135 |
| 47 | 50 | 53 | 56 | 60 | 64 | 68 | 72 | 77 |
| 27 | 28 | 30 | 32 | 34 | 36 | 39 | 41 | 44 |
| 15 | 16 | 17 | 18 | 19 | 21 | 22 | 23 | 25 |
| 9 | 9 | 10 | 10 | 11 | 12 | 13 | 13 | 14 |
| 5 | 5 | 6 | 6 | 6 | 7 | 7 | 8 | 8 |
| 3 | 3 | 3 | 3 | 4 | 4 | 4 | 4 | 5 |
| 2 | 2 | 2 | 2 | 2 | 2 | 2 | 2 | 3 |
| 1 | 1 | 1 | 1 | 1 | 1 | 1 | 1 | 1 |
| 1 | 1 | 1 | 1 | 1 | 1 | 1 | 1 | 1 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

| 39700 | 22620 | 12889 | 7344 | 4104 | 2384 | 1358 | 774 | 441 | 251 | 143 | 82 | 46 | 26 | 15 | 9 | 5 | 3 | 2 | 1 | 1 | 0 | 0 | 0 | 0 | 0 |
|---|---|---|---|---|---|---|---|---|---|---|---|---|---|---|---|---|---|---|---|---|---|---|---|---|---|
| 42261 | 24073 | 13720 | 7817 | 4454 | 2538 | 1446 | 824 | 469 | 267 | 152 | 87 | 49 | 28 | 16 | 9 | 5 | 3 | 2 | 1 | 1 | 0 | 0 | 0 | 0 | 0 |
| 44986 | 25632 | 14605 | 8322 | 4742 | 2702 | 1539 | 877 | 500 | 285 | 162 | 92 | 53 | 30 | 17 | 10 | 6 | 3 | 2 | 1 | 1 | 0 | 0 | 0 | 0 | 0 |
| 47868 | 27286 | 15547 | 8858 | 5047 | 2876 | 1639 | 934 | 532 | 303 | 173 | 98 | 56 | 32 | 18 | 10 | 6 | 3 | 2 | 1 | 1 | 0 | 0 | 0 | 0 | 0 |
| 50976 | 29045 | 16550 | 9430 | 5373 | 3061 | 1744 | 994 | 566 | 323 | 184 | 105 | 60 | 34 | 19 | 11 | 6 | 4 | 2 | 1 | 1 | 0 | 0 | 0 | 0 | 0 |
| 54264 | 30919 | 17617 | 10038 | 5719 | 3259 | 1857 | 1058 | 603 | 343 | 196 | 112 | 64 | 36 | 21 | 12 | 7 | 4 | 2 | 1 | 1 | 0 | 0 | 0 | 0 | 0 |
| 57763 | 32913 | 18753 | 10685 | 6088 | 3469 | 1977 | 1126 | 642 | 366 | 208 | 119 | 68 | 39 | 22 | 13 | 7 | 4 | 2 | 1 | 1 | 0 | 0 | 0 | 0 | 0 |
| 61489 | 35035 | 19963 | 11374 | 6481 | 3693 | 2104 | 1199 | 683 | 389 | 222 | 126 | 72 | 41 | 23 | 13 | 8 | 4 | 2 | 1 | 1 | 0 | 0 | 0 | 0 | 0 |
| 65455 | 37295 | 21250 | 12108 | 6899 | 3931 | 2240 | 1276 | 727 | 414 | 236 | 135 | 77 | 44 | 25 | 14 | 8 | 5 | 3 | 1 | 1 | 0 | 0 | 0 | 0 | 0 |

| | | | | | | | | |
|---|---|---|---|---|---|---|---|---|
| 37353 | 39763 | 40327 | 45057 | 47963 | 51056 | 54349 | 57854 | 61585 |
| 21283 | 22656 | 24117 | 25673 | 27328 | 29091 | 30967 | 32964 | 35090 |
| 12127 | 12909 | 13742 | 14628 | 15571 | 16575 | 17645 | 18782 | 19994 |
| 6910 | 7355 | 7830 | 8335 | 8872 | 9444 | 10054 | 10702 | 11392 |
| 3937 | 4191 | 4461 | 4749 | 5055 | 5381 | 5728 | 6098 | 6491 |
| 2243 | 2388 | 2542 | 2706 | 2880 | 3066 | 3264 | 3474 | 3698 |
| 1278 | 1361 | 1448 | 1542 | 1641 | 1747 | 1860 | 1980 | 2107 |
| 728 | 775 | 825 | 878 | 935 | 995 | 1060 | 1128 | 1201 |
| 415 | 442 | 470 | 501 | 533 | 567 | 604 | 643 | 684 |
| 236 | 252 | 268 | 285 | 304 | 323 | 344 | 366 | 390 |
| 135 | 143 | 153 | 163 | 173 | 184 | 196 | 209 | 222 |
| 77 | 82 | 87 | 93 | 99 | 105 | 112 | 119 | 127 |
| 44 | 47 | 50 | 53 | 56 | 60 | 64 | 68 | 72 |
| 25 | 27 | 28 | 30 | 32 | 34 | 36 | 39 | 41 |
| 14 | 15 | 16 | 17 | 18 | 19 | 21 | 22 | 23 |
| 8 | 9 | 9 | 10 | 10 | 11 | 12 | 13 | 13 |
| 5 | 5 | 5 | 6 | 6 | 6 | 7 | 7 | 8 |
| 3 | 3 | 3 | 3 | 3 | 4 | 4 | 4 | 4 |
| 1 | 2 | 2 | 2 | 2 | 2 | 2 | 2 | 2 |
| 1 | 1 | 1 | 1 | 1 | 1 | 1 | 1 | 1 |
| 0 | 1 | 1 | 1 | 1 | 1 | 1 | 1 | 1 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 | ized filename="p1.md">
NEURAL NETWORK OUTPUT LAYER FOR MACHINE LEARNING

RELATED APPLICATIONS

This application claims the benefit of U.S. provisional patent applications "Neural Network Output Layer for Machine Learning" Ser. No. 62/692,993, filed Jul. 2, 2018, "Data Flow Graph Computation Using Exceptions" Ser. No. 62/694,984, filed Jul. 7, 2018, "Reconfigurable Fabric Configuration Using Spatial and Temporal Routing" Ser. No. 62/773,486, filed Nov. 30, 2018, "Machine Learning for Voice Calls Using a Neural Network on a Reconfigurable Fabric" Ser. No. 62/800,432, filed Feb. 2, 2019, "FIFO Filling Logic for Tensor Calculation" Ser. No. 62/802,307, filed Feb. 7, 2019, "Matrix Multiplication Engine Using Pipelining" Ser. No. 62/827,333, filed Apr. 1, 2019. "Dispatch Engine with Queuing and Scheduling" Ser. No. 62/850,059, filed May 20, 2019, "Artificial Intelligence Processing Using Reconfiguration and Tensors" Ser. No. 62/856,490, filed Jun. 3, 2019, and "Dispatch Engine with Interrupt Processing" Ser. No. 62/857,925, filed Jun. 6, 2019.

This application is also a continuation-in-part of "Reconfigurable Fabric Data Routing" Ser. No. 16/104,586, filed Aug. 17, 2018, which claims the benefit of U.S. provisional patent applications "Reconfigurable Fabric Data Routing" Ser. No. 62/547,769, filed Aug. 19, 2017, "Tensor Manipulation Within a Neural Network" Ser. No. 62/577,902, filed Oct. 27, 2017, "Tensor Radix Point Calculation in a Neural Network" Ser. No. 62/579,616, filed Oct. 31, 2017, "Pipelined Tensor Manipulation Within a Reconfigurable Fabric" Ser. No. 62/594,563, filed Dec. 5, 2017, "Tensor Manipulation Within a Reconfigurable Fabric Using Pointers" Ser. No. 62/594,582, filed Dec. 5, 2017, "Dynamic Reconfiguration With Partially Resident Agents" Ser. No. 62/611,588, filed Dec. 29, 2017, "Multithreaded Dataflow Processing Within a Reconfigurable Fabric" Ser. No. 62/611,600, filed Dec. 29, 2017, "Matrix Computation Within a Reconfigurable Processor Fabric" Ser. No. 62/636,309, filed Feb. 28, 2018, "Dynamic Reconfiguration Using Data Transfer Control" Ser. No. 62/637,614, filed Mar. 2, 2018, "Data Flow Graph Computation for Machine Learning" Ser. No. 62/650,758, filed Mar. 30, 2018, "Checkpointing Data Flow Graph Computation for Machine Learning" Ser. No. 62/650,425, filed Mar. 30, 2018, "Data Flow Graph Node Update for Machine Learning" Ser. No. 62/679,046, filed Jun. 1, 2018, "Dataflow Graph Node Parallel Update for Machine Learning" Ser. No. 62/679,172, filed Jun. 1, 2018, "Neural Network Output Layer for Machine Learning" Ser. No. 62/692,993, filed Jul. 2, 2018, and "Data Flow Graph Computation Using Exceptions" Ser. No. 62/694,984, filed Jul. 7, 2018.

Each of the foregoing applications is hereby incorporated by reference in its entirety.

FIELD OF ART

This application relates generally to data manipulation and more particularly to neural network output layer for machine learning.

BACKGROUND

Researchers, businesspeople, and governments collect and analyze vast amounts of data. The data is most typically collected from people as they interact with their personal and other electronic devices. The interactions can be online, in public, or at home. The collection of public, personal, and other data has become so commonplace that the collection frequently goes unnoticed until there is a problem. An individual may be using her smartphone to research world events, while another person is using his tablet to order pet food or toner cartridges. Irrespective of the particular activity, metadata about the users' interactions with their devices is collected. Data and metadata include details such as websites visited, products and services searched or viewed, and radio buttons clicked. All of this data is collected and analyzed for purposes of monetization, security, or surveillance, among others. Analysis results are used to push online content, products, or services that are predicted to match user interests.

Emerging software analysis techniques and processor architectures are propelling the collection of personal and other data at an accelerating rate. Businesspeople, researchers, and governments aggregate the collected data into datasets that are often referred to as "big data". The big data datasets can then be analyzed. The sizes of the big data datasets overwhelm the capabilities of the traditional processors and analysis techniques, making the analysis economically infeasible. Other data handling requirements, such as the access, capture, maintenance, storage, transmission, and visualization of the data, among other tasks, further complicate the computational and processing requirements. Any one of these data handling requirements can quickly saturate or exceed the capacities of the traditional systems. The collected data would be of little or no fundamental value without viable and scalable data analysis and handling techniques. Innovative computing architectures, as well as software techniques, algorithms, functions, routines, and heuristics, are necessitated. Dataset stakeholders are motivated by business, research, and other interests to analyze the data. Common data analysis purposes include business analysis; disease or infection detection, tracking, and control; crime detection and prevention; meteorology; and complex scientific and engineering simulations; among many others. Advanced data analysis techniques are finding applications such as predictive analytics, which can be used to show consumers what they want, even before the consumers know that they want it. Further approaches include applying machine learning and deep learning techniques in support of the data analysis.

Advanced processing hardware has been introduced, as have software learning techniques, which have been a boon to many computer science disciplines including machine learning. Machine learning posits that a machine, on its own, can "learn" about a unique dataset. The machine learning occurs without requiring that the machine be explicitly coded or programmed by a user to handle that dataset. Machine learning can be performed on a network of processors such as a neural network. The neural network can process the big data datasets so that the neural network can learn about the data contained within the dataset. The greater the quantity of data, and the higher the quality of the data that is processed, the better the outcome of the machine learning. The processors on which the machine learning techniques can be executed are designed to efficiently handle the flow of data. These processors, which are based on data flow architectures, process data when valid data is presented to the processor. Data flow architectures enable simplifications to a processing system such as avoiding a need for a global system clock.

Computing architectures based on reconfigurable hardware are highly flexible and particularly well suited to processing large data sets, performing complex computations, and executing other computationally resource-intensive applications. Reconfigurable computing integrates the key advantages drawn from hardware and software techniques. A reconfigurable computing architecture can be "recoded" (reprogrammed) to suit a processing need. The recoding adapts or configures the high-performance hardware architecture, much like recoding software. A reconfigurable fabric hardware technique is directly applicable to reconfigurable computing. Reconfigurable fabrics may be arranged in topologies or configurations for the many applications that require high performance computing. Applications such as processing of big data, digital signal processing (DSP), machine learning based on neural networks, matrix or tensor computations, vector operations, Boolean manipulations, and so on, can be implemented within a reconfigurable fabric. The reconfigurable fabric fares particularly well when the data includes specific types of data, large quantities of unstructured data, sample data, training data, and the like. The reconfigurable fabrics can be coded or scheduled to achieve these and other processing techniques, and to represent a variety of efficient computer architectures.

SUMMARY

A data flow graph is a representation of both the flow of data and the operations performed on the data. A data flow graph is particularly well suited to visualizing the inner workings of a variety of complex computing tasks by representing the calculations and flow of data required to perform those tasks. Machine learning is one computational example that can be represented using data flow graphs. Machine learning is a technique by which a computing system, such as a computer, a processor, a reconfigurable fabric, etc., can be configured to "learn". That is, using data examination, the computing system adapts and improves inferences, computational performance, and so on. Machine learning systems are often based on networks such as neural networks. Neural network implementations include convolutional neural networks (CNNs), deep neural networks, (DNNs), recurrent neural networks (RNNs), and so on. A reconfigurable fabric can be adapted or "recoded" to implement a desired data flow graph or neural network. The neural network itself can be adapted by changing a code used to configure elements of the reconfigurable fabric, parameters, or values such as weights or biases processed by the neural network, and the like. The reconfigurable fabric can include a variety of computational or processor elements, storage elements, communication elements, switching elements for data transfer, control elements, and so on. The reconfigurable fabrics are coded or scheduled to implement a variety of processing topologies which are well suited to machine learning. The reconfigurable fabric can be configured by coding or scheduling the reconfigurable fabric to execute a variety of logical operations such as machine learning operations, Boolean operations, matrix operations, tensor operations, mathematical operations, etc. The scheduling of the reconfigurable fabric can be changed for a machine learning operation based on a neural network.

A neural network output layer is implemented for machine learning. Embodiments include a processor-implemented method for data manipulation comprising: configuring a plurality of processing elements within a reconfigurable fabric to implement a data flow graph, wherein the data flow graph implements a neural network; implementing a layer, within the neural network, that maps a first vector of real values to a second vector of real values bounded by zero and one wherein the second vector sums to a value of one using fixed-point calculations; and classifying results of the neural network based on a value of the second vector. In embodiments, the layer that maps the first vector comprises a Softmax function. In embodiments, the layer that maps the first vector is an output layer for the neural network. In embodiments, the layer is based on a parabolic estimator function. And in embodiments, the parabolic estimator function is implemented using lookup tables.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 3 shows a table of complexity.

FIG. 4A illustrates a table for function f(n) with base k=e.

FIG. 4B illustrates a table for function g(i) with base k=e.

FIG. 4C illustrates a table for function h(i) with base k=e.

DETAILED DESCRIPTION

Figure 1:
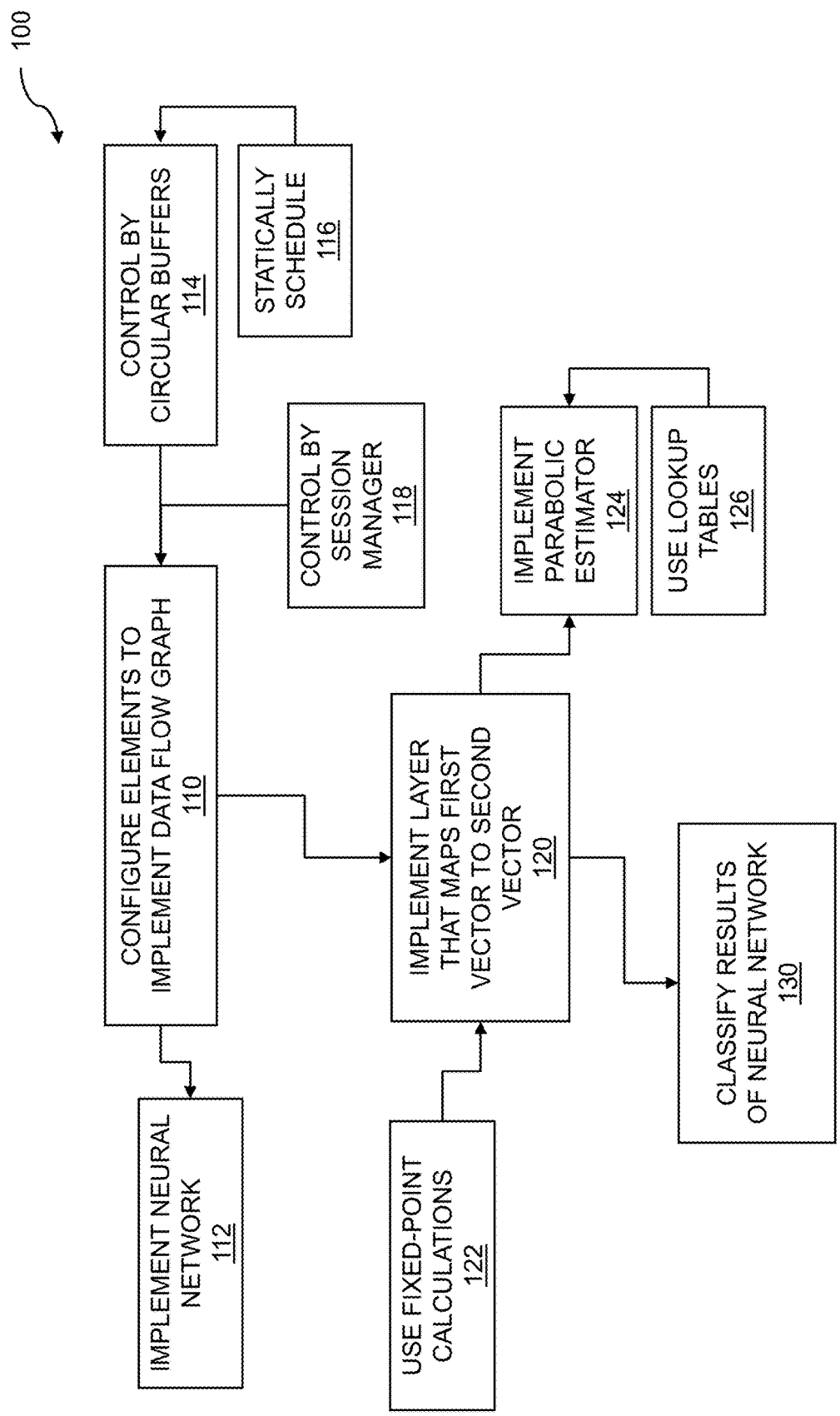
FIG. 1 is a flow diagram for neural network output layer for machine learning.

Techniques are disclosed for a neural network output layer for machine learning. Neural network or machine learning computations can be performed on a computing device, a reconfigurable computing device, and so on. A variety of techniques can be used for a reconfigurable computing device including a reconfigurable fabric. A reconfigurable fabric is a reconfigurable computing device that incorporates technical advantages of both hardware techniques and software techniques. The hardware techniques include high performance computer architectures designed for computational speed and efficiency. The included software techniques enable the hardware to be easily reconfigured for specific computational tasks such as neural network computation, machine learning, and the like. A reconfigurable fabric can include one or more element types, where the element types can include processing elements, storage elements, switching elements, communications elements, and so on. An element can be configured to perform a variety of architectural and computational operations based on the type of element and by programming (coding) or "scheduling" the element. The reconfigurable fabric can be organized in various groupings or configurations. The reconfigurable fabric can include quads of elements, where the quads include processing elements, shared storage elements, switching elements, control elements based on rotating circular buffers, communications paths, signaling paths, and the like. An element or subset of elements within the reconfigurable fabric, such as a quad of elements, can be controlled by providing code to one or more circular buffers. The code can be executed by enabling the circular buffers to rotate. Code such as agent code can also be provided to elements within the reconfigurable fabric so that the reconfigurable fabric can perform intended computational tasks such as machine learning operations, logical operations, matrix computations, tensor operations, mathematical operations, etc. The various elements of the reconfigurable fabric can be controlled by the rotating circular buffers, where the one or more circular buffers can be of the same length or differing lengths. Functions, algorithms, instructions, codes, etc., which can support computational applications such as machine learning, can be loaded into a given circular buffer. The rotation of the given circular buffer ensures that the same series of coded steps or instructions is repeated for as for as long and often as required by the processing tasks assigned to a processing element of the reconfigurable fabric. The one or more rotating circular buffers can be statically scheduled.

Machine learning is based on a neural network output layer. A neural network is based on a data flow graph, where the data flow graph includes nodes that perform computations and arcs that indicate the flow of data between and among the nodes. A plurality of processing elements within a reconfigurable fabric is configured to implement a data flow graph. The reconfigurable fabric can include other elements such as processing elements, storage elements, switching elements, or communications paths. The data flow graph that is implemented represents a neural network. The data flow graph can include machine learning or deep learning. A layer is implemented, within the neural network, that maps a first vector of real values to a second vector of real values bounded by zero and one. The layer can be a final layer within the neural network. The layer that maps the first vector to the second vector can include a variety of techniques. The layer that maps the first vector can include a Softmax function or a parabolic estimator function. The parabolic estimator function can be implemented using lookup tables. The layer that maps the first vector can be an output layer for the neural network. The parabolic estimator function can be based on a moving set of three points. The parabolic estimator function can implement $e^{Xi}$ or $k^{Xi}$ for the layer, where Xi are the arguments of the Softmax function, and k is a real number greater than 1. In embodiments, $k^{Xi}$ can be calculated using 16-bit fixed-point arithmetic, where k is equal to 2. The second vector sums to a value of one using fixed point calculations. Results of the neural network are classified based on a value of the second vector. The classifying can be part of a machine learning process. The classifying can be part of a deep learning process.

FIG. 1 is a flow diagram for data flow graph node update for machine learning. The flow 100 includes configuring a plurality of processing elements within a reconfigurable fabric to implement a data flow graph 110, where the data flow graph implements a neural network 112. The data flow graph that can represent the neural network includes nodes and arcs, where the nodes can correspond to operations. The operations of the nodes can include agents. The arcs of the data flow graph represent the flow of data between and among the nodes. In embodiments, a node within the data flow graph comprises a variable node. Parameters of the variable node can be adjusted, determined, calculated, etc., where the adjusting, for example, can be performed to improve data flow graph performance, convergence, and so on. By extension, the parameters of the variable node can be adjusted as the neural network is trained, as discussed elsewhere. In embodiments, the variable nodes contain weights for deep learning or machine learning. The weights for deep learning can be adjusted. The reconfigurable fabric can include clusters of processing elements, where the clusters of processing elements can include quads of processing elements.

The reconfigurable fabric can include other types of elements such as storage elements, switching elements, and so on. In embodiments, the processing elements can be controlled by circular buffers 114. The circular buffers can include rotating circular buffers. The configuring of the processing elements can be accomplished by scheduling or loading commands, instructions, code, schedules, etc., into the circular buffers. In embodiments, the circular buffers can be statically scheduled 116. The reconfigurable fabric can be self-timed or self-clocked, thereby obviating the need for an external clock such as a system clock or polyphase clock. In embodiments, the reconfigurable fabric is self-clocked on a hum basis. The data flow graph can include deep learning, where the deep learning can be performed by a deep learning network. The data flow graph can include machine learning. In embodiments, the data flow graph can be used to train a neural network. The data flow graph can represent a neural network such as a deep neural network (DNN), a convolutional neural network (CNN), and the like. In other embodiments, the neural network can include a recurrent neural network (RNN). The configuring of the processing elements can be managed. In embodiments, the configuring is controlled by a session manager 118. The session manager can be located within or beyond the reconfigurable fabric. In embodiments, the session manager is part of a host located outside of the reconfigurable fabric. The host can be a computer, a processor, a server, a blade server, a remote server, and so on. In embodiments, the host is a LINUX-based host. The host can also be based on UNIX™, Windows™, macOS™, and so on.

The flow 100 includes implementing a layer, within the neural network, that maps a first vector of real values to a second vector of real values 120. The real values of the second vector can be bounded by zero and one. The real values of the second vector can be added, or summed, where the second vector sums to a value of one. The summation is accomplished using fixed-point calculations 122. The fixed-point calculations can be based on signed magnitude number representations, one's complement representations, two's complement representations, and so on. The fixed-point calculations can be based on various precisions, where the precisions can include 8-bit, 16-bit, 24-bit, 32-bit precision, and so on. Various arithmetic operations can be performed within the fixed-point calculations including addition, subtraction, multiplication, or shifting. Multiplication can be accomplished by repeated addition, shifting left if multiplying by a power of two, and so on. In embodiments, arithmetic division is accomplished using shifting. Division by a power of two can be accomplished by shifting right.

The layer that is implemented can be any input layer, hidden layer, or other layer within the neural network. In embodiments, the layer is a final layer within the neural network. The layer that performs the mapping can implement a variety of functions, techniques, algorithms, heuristics, and so on. In embodiments, the layer that maps the first vector comprises a Softmax function. As discussed throughout, the Softmax function can normalize or "compress" a real-valued vector of k-dimensions to another real-valued vector of k-dimensions, where the latter vector includes values between zero and one [0, 1]. The layer that maps the first vector can be an output layer for the neural network.

The layer can perform other functions. In embodiments, the layer is based on a parabolic estimator function 124. A parabolic estimator function can fit a parabola to three or more points of a function. The parabolic estimator function can be based on a moving set of three points. The parabolas can be used to find a minimum or a maximum for the function. The extremum that is found can replace one of the three points of the function, and the fitting can continue. The parabolic estimator function can include making a substitution or replacement. In embodiments, the parabolic estimator function can implement $e^{Xi}$ or $k^{Xi}$ for the layer, where Xi are arguments of the Softmax function, k is a real number greater than 1, and e is the natural logarithm base. Various values of k can be used. In embodiments, k is equal to 2. Computation of values can be accomplished based on a variety of number representation techniques. In embodiments, $k^{Xi}$ is calculated using 16-bit fixed-point arithmetic.

The parabolic estimator function can be implemented based on a variety of techniques. In embodiments, the parabolic estimator function can be implemented using lookup tables 126. One or more lookup tables can be used. In embodiments, the parabolic estimator function is implemented using one lookup table. In embodiments, the one lookup table can include 32 elements. In embodiments, the lookup tables comprise three lookup tables. The three lookup tables can be of the same length or of different lengths. In embodiments, the three lookup tables can each be 256 elements or fewer in length. The length of the lookup tables can be determined by a level of precision needed in order to expedite the convergence of learning by the neural network. The lookup tables can include equidistant points of a given function. The values of the function at the equidistant points can be stored in the lookup tables. Various scenarios can be used to determine which set of equidistant point to use for inclusion in the lookup tables. In embodiments, values between two equidistant points within a lookup table can correspond to an integer number of intervals between the two points. Any integer can be used for determining the intervals. In embodiments, the integer number of intervals be can based on a power of two. Various techniques can be used to calculate values that can be stored in the one or more lookup tables. In embodiments, lookup table entries are calculated offline. This calculation can be accomplished using three lookup tables in combination with two multipliers to minimize the complexity of the required hardware while implementing the Softmax function with 16-bit precision. The Softmax function includes a single division operation, but in embodiments, it can be replaced by a multiply operation with a corresponding factor that is calculated. In embodiments, the Softmax function can be implemented with three lookup tables and two multiplications. In embodiments, the Softmax function can use two multipliers per element of an output vector. In embodiments, the Softmax function can use no more than three multipliers per element of an output vector.

The flow 100 includes classifying results of the neural network 130 based on a value of the second vector. Classification can include analyzing data to determine to which of a possible set of categories a particular datum applies or belongs. The classifying can be applied to training a neural network. In a usage scenario, a known set of data can be applied to a data flow graph that implements a neural network. The known set of data includes known inputs and expected outputs. The known inputs and expected outputs can be organized in pairs so that given input A, expect output B. The application of the known inputs and examination of expected outputs can be used to train the neural network. In embodiments, the classifying is part of a machine learning process. The neural network can "learn" by examining the known inputs and adjusting or learning so that the outputs produced by the neural network match the expected outputs. The learning can be accomplished using a variety of techniques such as gradient descent. In embodiments, the classifying is part of a deep learning process.

Various embodiments of the flow 100 can be included in a computer program product embodied in a non-transitory computer readable medium that includes code executable by one or more processors.

Figure 2:
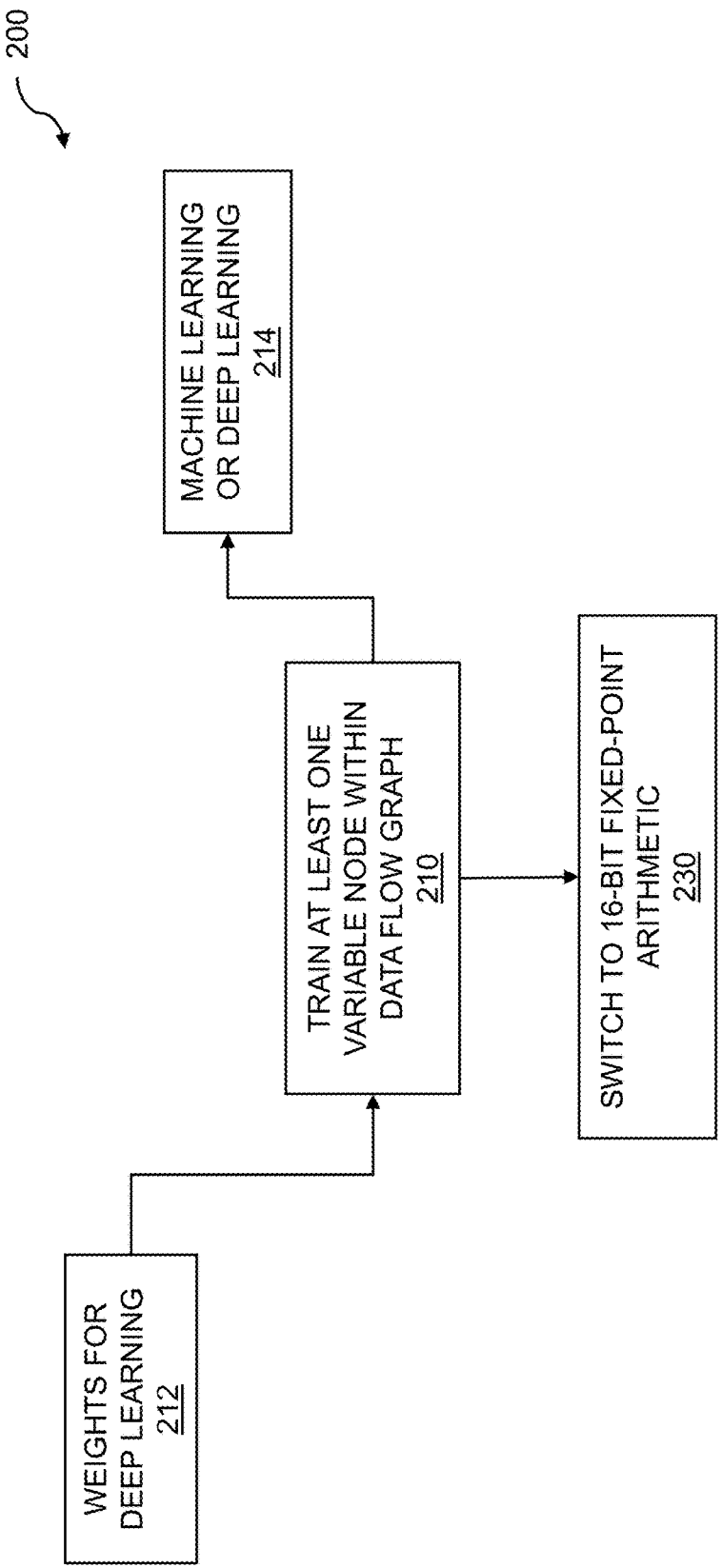
FIG. 2 is a flow diagram for training variable nodes.

FIG. 2 is a flow diagram for training variable nodes. As discussed throughout, a data flow graph can be used to represent processing operations performed on data as the data flows among nodes of the graph. In embodiments, some of the nodes can be variable nodes. Various parameters of the variable nodes can be adjusted, where the adjusting can be performed to improve data flow graph performance, neural network performance, convergence, and so on. In embodiments, the variable nodes contain weights for deep learning 212, biases, and so on. The weights, biases, coefficients, etc. for deep learning can be adjusted or trained. The flow 200 includes training at least one variable node 210 within nodes of the data flow graph. The training can include supervised training. For supervised training, datasets including known inputs and known outputs can be applied to the data flow graph representing a neural network. The neural network learns to recognize the expected outputs for the given inputs so that when new data is applied, the neural network can make inferences about the new data based on the training data. The learning can be based on unsupervised training. For unsupervised training, the neural network, data flow graph, etc., infers a function that can be used to describe a structure within data. The more data that is applied to the network or graph, the more able the function will be to describe a structure. The training can be based on classifying. In embodiments, the classifying can be part of a machine learning deep learning process 214.

The flow 200 includes using fixed-point arithmetic for one or more initial training passes through the neural network. The arithmetic can be applied to computations including intermediate computations. The intermediate computations can include calculating a large sum, where the large sum can be included in a denominator for a Softmax function, a parabolic estimator function, and so on. The arithmetic can include computation bits and index bits. The initial training passes through the neural network and can use the 24-bit arithmetic to increase or accelerate convergence of the training. The flow 200 can include switching to 16-bit fixed-point arithmetic 230 for subsequent training passes after the one or more initial training passes through the neural network. With training convergence begun, fewer bits can be used in the arithmetic since values or coefficients within the calculations for convergence can approach zero or one. Lower precision, that is 16-bit arithmetic as opposed to 24-bit arithmetic, is sufficient for further computations. The lower precision arithmetic operation reduces the load on computational resources.

FIG. 3 shows a table of complexity. A table of complexity 300 can indicate a number of operations to be performed, such as operations related to computations of a data flow graph representing a neural network output layer for machine learning. The operations can include memory accesses, arithmetic operations such as additions, subtractions, multiplications, or divisions, Boolean operations, matrix operations, tensor operations, and so on. The operations can include a number of times that a memory, register file, register, table, etc., is accessed to read values, store values, and the like. A table 310 is shown. The table shows a variety of operations that can be performed for the computation of 1/K 312. The operations can include one or more of a memory access, table access, multiplication, rounding (as opposed to truncation), comparison, shift, and so on. The operations can include difference precisions such as 32-bit precision, 24-bit- 16-bit, 8-bit, etc. The table of complexity can include a number of operations, of the various types, performed for one or more parabolic estimator functions. A parabolic estimator function can be implemented with one table 314, where the table can include a lookup table. The one table 314 can be 32 elements in length. Another parabolic estimator function can be implemented with three tables 316. The parabolic estimator function that can be implemented with three tables can include tables 316 that can each be 128 elements in length. The larger tables can be used to store a larger number of interpolation points between a moving set of three points used by the parabolic estimator function. In embodiments, lookup table entries can be calculated offline.

FIG. 4A illustrates a table for function f(n) with base k=e, where e is the natural logarithm base. As discussed throughout, a data flow graph can be used to implement a neural network. The neural network can include a neural network output layer for machine learning. The machine learning can include deep learning. In order for the neural network to perform machine learning or deep learning, the neural network can be trained. The training can be based on techniques such as gradient descent and the like. The output layer of a neural network can be used for classification, where classification can be used to make predictions about data. Various techniques can be used for the classification by the output layer of the neural network, such as a Softmax function, a parabolic estimator function, and so on. A Softmax function can map a vector that includes arbitrary values to a vector of real values. For the Softmax function, the real values can be included within the rage of zero to one [0, 1]. The sum of the vector resulting from the Softmax function equals one. The Softmax function can be generalized for a neural network as:

$$f(x) = k^{x_i} / \sum_{n=1}^{N} k^{x_n}$$

The parabolic estimator function can include successive parabolic interpolation. Successive parabolic interpolation can be used to find a minimum or a maximum by successively fitting parabolas to a curve. The parabolas are fitted based on three or more points of a function. As a minimum or a maximum is found, one of the three points can be eliminated, and the extremum can replace it. Parabolic interpolation can be described by:

$$f(n) = f(0) + x \cdot g(0) + x^2 \cdot h(0)$$

Where $$g(0) = \frac{-3 \cdot f(0) + 4 \cdot f(h) - f(2 \cdot h)}{2}$$

And $$h(0) = \frac{f(0) - 2 \cdot f(h) + f(2 \cdot h)}{2}$$

The values can be computed off line and stored in a table. The values for f(n) are shown 400.

FIG. 4B illustrates a table for function g(i) with base k=e, where e is the natural logarithm base. As discussed previously, g(n) can be included in computing a parabolic estimator function or interpolation function. The equation g(0) is shown previously, where g(0) can be used to interpolate a function between 0 and 1. The equation can be rewritten as g(i), where i can have a wider range of values. The table for g(i) is shown 402.

FIG. 4C illustrates a table for function h(i) with base k=e, where e is the natural logarithm base.

In addition to performing parabolic estimation based on f(n), h(n) can be included in the estimation. As discussed previously, h(n) can be included in computing an interpolation function. The equation h(0) is shown previously. The equation h(0) can be used to interpolate a real valued function between 0 and 1. The equation for h(0) can be rewritten as h(i), where i can have a wider range of values. The table for h(i) is shown 404.

Figure 5:
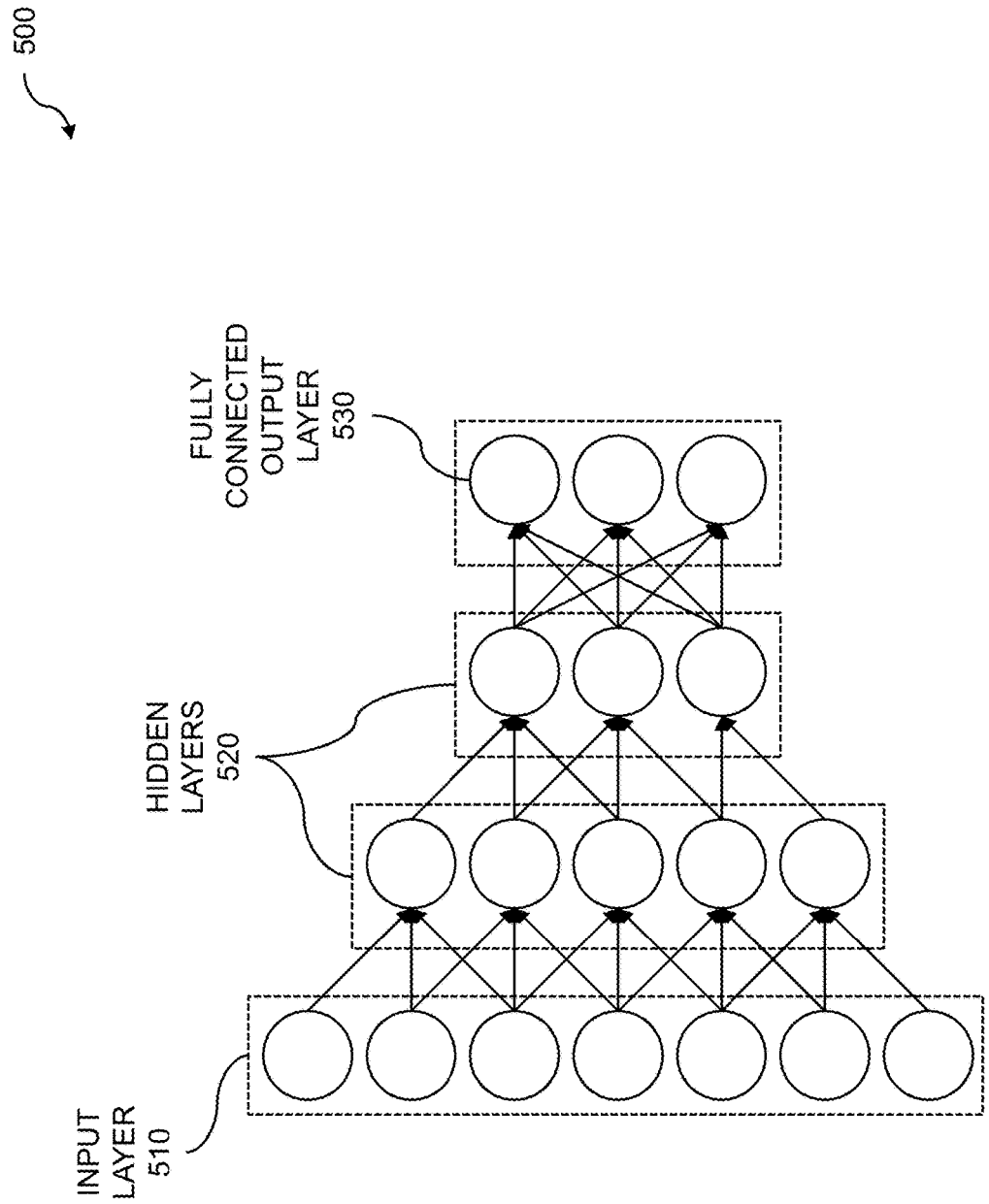
FIG. 5 shows a network for a data flow graph.

FIG. 5 shows a network for a data flow graph. A network can include various portions such as interconnects, communication channels, processing elements, storage elements, and so on. A network can implement a neural network. A network can be implemented using one or more computing devices, a computational device, one or more processors, a reconfigurable fabric of processing elements, and so on. A network for executing a data flow graph can be assembled. A data flow graph is a representation showing how data, such as image data, matrices, tensors, and so on, flows through a computational system. A data flow graph includes nodes and arcs, where the nodes represent operations on data, and the arcs represent the flow of data. The operations of the nodes can be implemented using agents. The data flow graph can be implemented on the network by assigning processing elements, storage elements, switching elements, etc. to nodes or agents and to arcs of the data flow graph. The network can support a neural network output layer for machine learning.

A network 500 is shown. The network includes layers, where the layers can include an input layer 510, an output layer, such as a fully connected output layer 530, and one or more hidden layers 520. The layers of the network can include one or more bottleneck layers. The network can include a deep neural network (DNN), a convolutional neural network (CNN), and so on. The network can implement a machine learning system. The input layer 510 can receive input data, where the input data can include sample data, test data, image data, audio data, matrices, tensors, and so on. The input layer can receive other data such as weights. The nodes of the input layer can perform an operation on the data, where the operation can include a multiplication, an addition, an accumulation (A=A+B), and so on. The input layer can be connected to one or more hidden layers 530. The hidden layers can perform a variety of operations on the input data and on other data such as bias values. The hidden layers can include one or more bottleneck layers. The bottleneck layer can include a layer that includes fewer nodes than the one or more preceding hidden layers. The bottleneck layer can create a constriction within the network. The bottleneck layer can force information that is pertinent to an inference, for example, into a lower dimensional representation. The one or more hidden layers can be connected to an output layer. In the example 500, the output layer can be a fully connected layer 530. In a fully connected layer, each node, agent, or neuron in a layer such as the output layer is coupled to each node of another layer. In the case of an output layer, each node of the output layer is coupled to each node of a preceding hidden layer. A fully connected layer can improve classification of data by examining all of the data in a previous layer rather than examining just a subset of the data. An equivalent convolutional layer can represent a fully connected layer. For computational reasons, a convolutional layer may be used in place of a fully connected layer.

Figure 6:
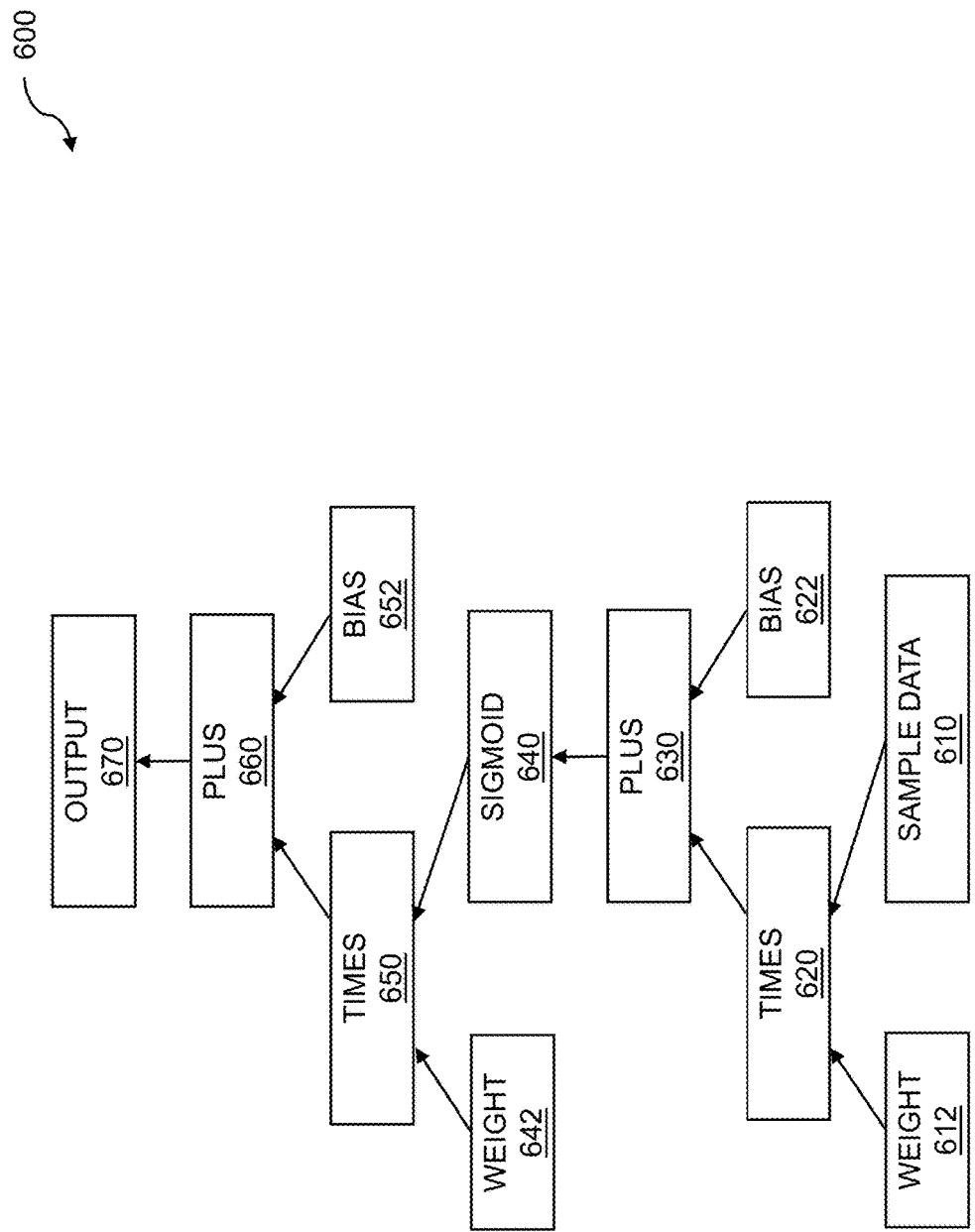
FIG. 6 illustrates a deep learning program graph.

FIG. 6 illustrates a deep learning program graph. A program graph can be a computational representation of a data flow graph, where a data flow graph can represent a neural network. The data flow graph can include machine learning or deep learning. The deep learning program graph can show operations and data flow for a neural network output layer for machine learning. A program graph can show both the logical operations to be performed on data, and the flow of data between and among the logical operations. The program graph can show inputs, where the inputs can collect various types of data. The data can include test data, sample data, weights, biases, and so on. The program graph can show logical operations, where the logical operations can include Boolean operations, matrix operations, tensor operations, mathematical operations, and the like.

A deep learning (DL) program graph is shown 600. The deep learning program graph can include inputs and computational nodes. The inputs to the DL graph can include sample data 610 or test data, weights 612, and so on. The input data can include matrices, tensors, data files of images, and so on. The inputs can be operated on by a computation node. The computation node 620 can perform a multiplication of the weights 612 and the sample data 610. Other computational nodes can be included in the deep learning program graph. An addition node plus 630 can calculate a sum of the products or the partial products from times and bias values 622. The bias values can be used to enhance performance of a deep neural network such as a DL network by improving convergence, improving inferences, etc. The one or more sums from the plus node 630 can be processed by a sigmoid node 640. A sigmoid node 640 can be used to perform an activation function such as a rectified linear unit (ReLU) operation, a hyperbolic tangent (tanh) operation, and so on. A further computation node 650 can perform a multiplication operation, times. The times operation can multiply the results of processing data with the sigmoid function by weights 642. A further computation node plus 660 can compute the sum of the products or the partial products from times and bias values 652. The sums computed by plus 660 can be routed to an output node such as output node 670. Data can be collected from the output node for various purposes such as storage, processing by a further program graph, and so on.

Figure 7:
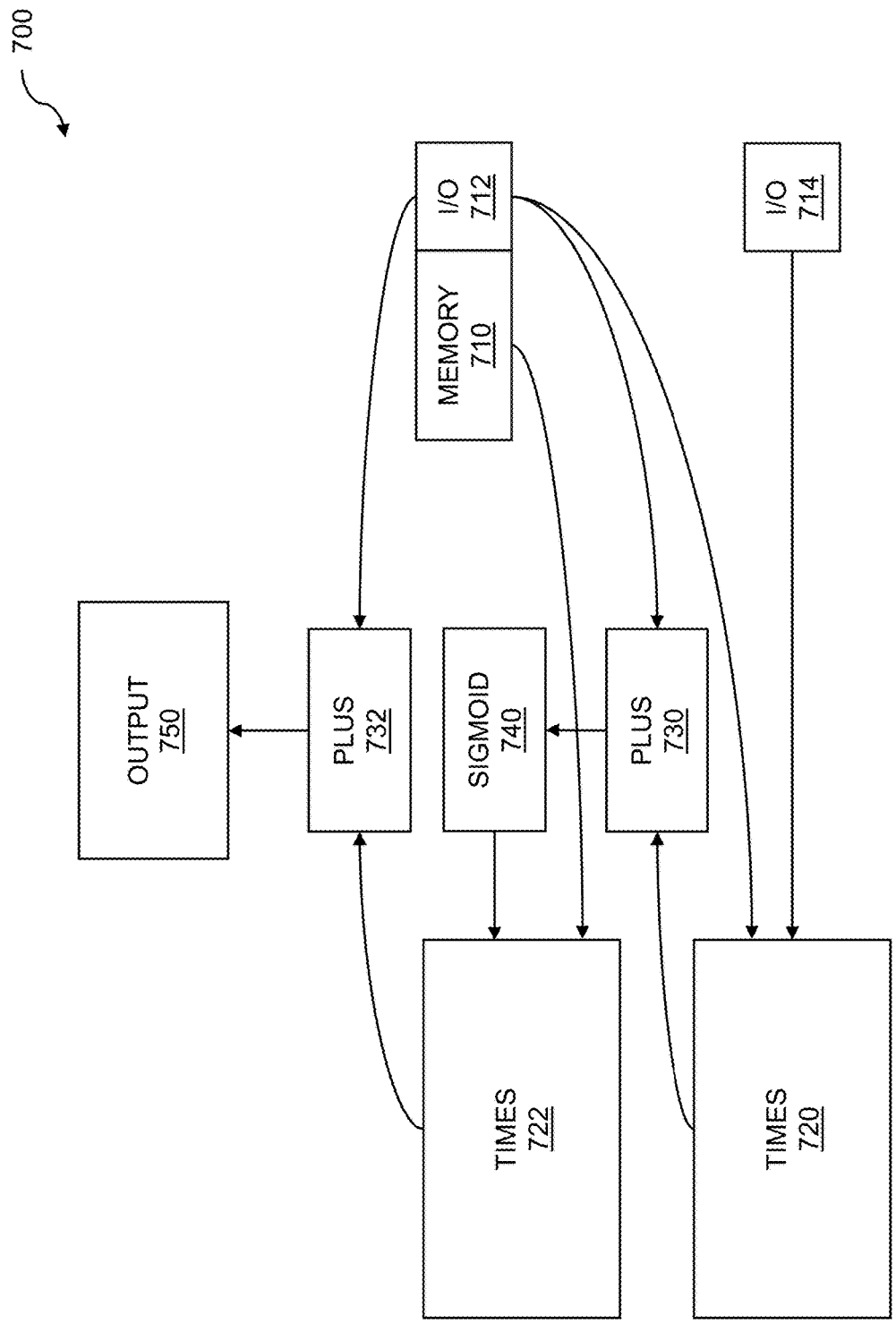
FIG. 7 shows an assembled data flow graph for runtime.

FIG. 7 shows an assembled data flow graph for runtime 700. In its most general sense, a data flow graph is an abstract construct which can describe the flow of data from one or more input nodes, through processing nodes, to one or more output nodes. The processing nodes describe operations such as logical operations, matrix operations, tensor operations, Boolean operations, etc., that can be performed on that data. The operations of the nodes can be performed by agents. To execute the data flow graph, the data flow graph can be assembled at runtime. The assembly can include configuring input/output, memory input/output, and so on. The assembled data flow graph can be executed on the data flow processor. The execution of the assembled data flow graph supports a neural network output layer for machine learning.

The techniques for assembling the data flow graph for runtime can be analogous to classic compilation of code. The steps of compilation of code can include preprocessing, compiling, assembling, linking, and so on. Inputs and outputs can be assigned to input/output ports of a computing device, a reconfigurable fabric, etc.; buffers can be assigned to store, retime, or buffer data; agents can be assigned to processing elements; etc. The result of the linking can include an "execution module" or executable code that can be executed on a computing device. The executable code of the assembled data flow graph for runtime can be assigned to clusters of processing elements within the reconfigurable fabric. Processing elements of the reconfigurable fabric can be configured to implement the agents of the data flow graph by statically scheduling rotating circular buffers, where the rotating circular buffers can control the operation of the processing elements. A set of buffers can be initialized for an agent. The buffers can be located within or beyond the reconfigurable fabric.

An assembled data flow graph for runtime is shown. The assembled data flow graph can include memory 710 for storing data, intermediate results, weights, etc., input/output ports 712, and further input/output ports 714. The input/output ports can include assigned input/output ports of the reconfigurable fabric, communications paths through the fabric, and the like. The input/output ports can receive learning data, raw data, weights, biases, etc., and can send computation results, inferences, back-propagated weights, etc. The assembled data flow graph can include multiplication agents, such as a first times agent 720 and an additional times agent 722. The first times agent 720 can multiply sample data or test data by weights, the second times agent 722 can multiply weights by a sigmoid function 740, and so on. The assembled data flow graph can further include addition agents, such as a first plus agent 730 and second plus agent 732. The plus agent 730 can add partial products or products from times agent 720 to bias values. The plus agent 732 can add partial products or products from times agent 722 with bias values. The sums, partial sums, etc., that can be calculated by the add agent 732 can be output 750. The output can include computational results, inferences, weights, and so on.

Figure 8:
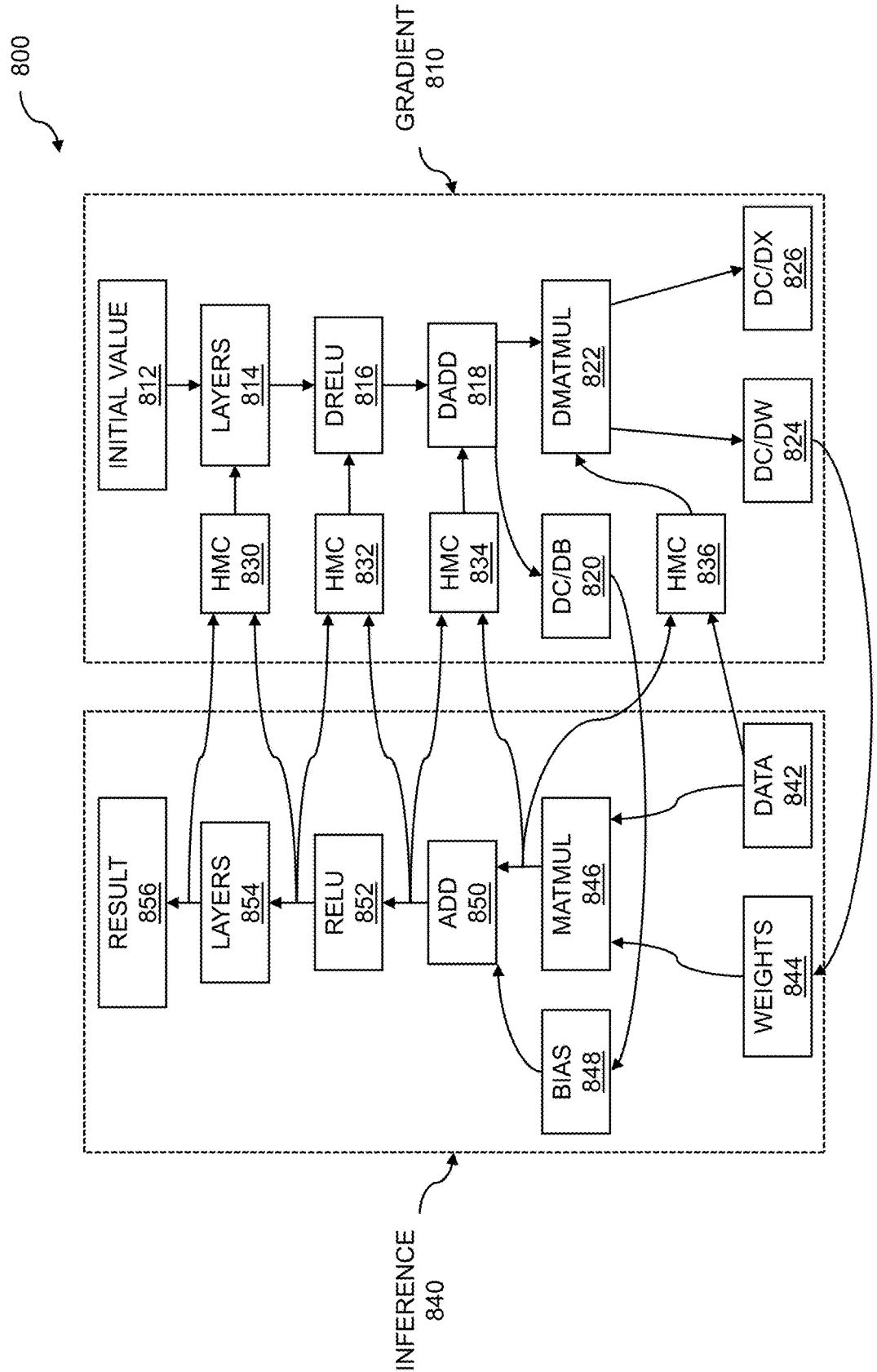
FIG. 8 illustrates batch processing for training.

FIG. 8 illustrates batch processing for training. As discussed throughout, a data flow graph can represent a neural network, a machine learning network, a deep learning network, and so on. The deep learning network can be trained autonomously using a neural network output layer for machine learning. The training of a deep neural network (DNN) for deep learning (DL) can be an iterative process in which data from a large dataset is applied to the DNN. The data in the large dataset can be preprocessed in order to improve training of the DNN. The DNN attempts to form inferences about the data, and errors associated with the inferences can be determined. Through various techniques such as back propagation and gradient-based analysis, weights of the DNN can be updated with an adjusted weight which can be proportional to an error function.

Training of a data flow graph for deep learning is shown 800. The deep learning network can include a gradient side 810 and an inference side 840. The gradient side can be used to perform gradient descent or other techniques for error analysis which can facilitate the determining of weights and adjustments to weights for the deep learning network. An initial value 812 can be provided at an input node of the gradient side. The initial value can be processed by layers 814 of the deep learning network, where the layers can include an input layer, hidden layers, an output layer, etc. Data such as error data from the inference side can be fed back to the gradient side by storing the data in a hybrid memory cube (HMC) 830. The data in the HMC can be fed into the layers 814 for reducing inference error. The network can include one or more differential rectified linear units (dReLUs) 816. The dReLU can execute an activation function on data received from the layers and from an HMC 832. Data can be applied to a differential addition dAdd operation 818. The dAdd operation data can also include data that can be fed back from the inference portion of the deep learning network. Data such as error data from the inference portion of the DLN can be stored in HMC 834, and the dAdd operation can process that data. An output such as dC/dB 820 can be calculated, where C can indicate a differential result, and B can indicate a bias, where the bias can enhance DNN operation. The bias can be used to enable neurons of the DNN to fire as desired even for data values near or equal to zero. The gradient portion of the DLN can include a differential matrix multiplication (dMatMul) 822 operation. The dMatMul operation can process data output from the dAdd operation and data stored in HMC 836. The data stored in the HMC can include results from an operation such as a matrix multiplication operation, training data, and so on. The dMatMul operation can generate one or more outputs such as dC/dx 826, where C can indicate a differential result, dC/dW 824, where W can indicate a differential weight.

The inference side of the DNN 840 can take as inputs data 842 such as training data; weights 844, which can include or be adjusted by the dC/dW values 824; and bias values 848, which can include or be adjusted by dC/dB values 820. The weights and the data can be processed by a matrix multiplication (MatMul) operation 846. The results of the MatMul operation can be added with the bias values 848 using an addition operation 850. The results of the addition operation can be processed using an activation function such as a sigmoid function. A sigmoid function can include a rectified linear unit (ReLU) 852 where $f(x)=\max(0,x)$, a hyperbolic tangent function, an error function, and so on. The inference side of the DNN can include one or more layers 854, where the layers can include an input layer, an output layer, hidden layers, a bottleneck layer, etc. The output of the DNN layers can include a result 856. The result can include an inference determined for data, training data, and the like and can be based on an error or difference between the calculated result and an anticipated result. The training can continue until a desired level of training error such as a minimum error or target error can be attained.

Figure 9:
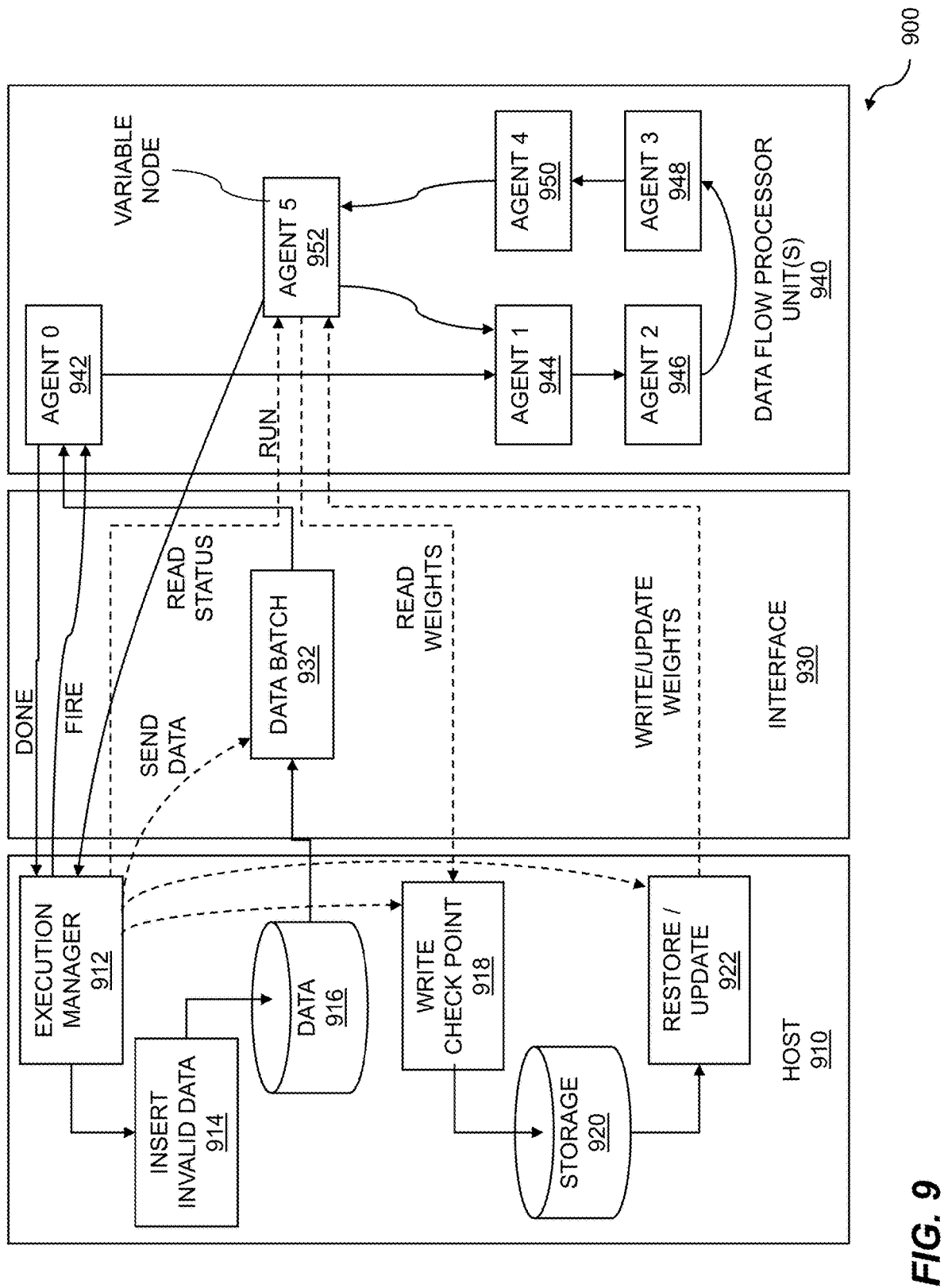
FIG. 9 shows execution manager operation.

FIG. 9 shows execution manager operation. An execution manager can include a session manager, where a session manager can be associated with a data flow graph, a neural network, and so on. The execution manager can perform a variety of tasks in support of the data flow graph or neural network. The tasks that can be performed by the execution manager can include providing data to input agents of the data flow graph, collecting output data from output agents, issuing fire signals to input agents of the data flow graph and receiving done signals from the input agents, sending done signals to the output agents and receiving done signals from the output agents, pausing and restarting data flow graph execution, and so on. The execution manager can enable a neural network output layer for machine learning.

An example of execution manager operation is shown 900. The execution manager 912 can reside on a host 910, from which it can exert control on the flow of data 916. The host can include a computing device such as a local computer, a remote computer, a cloud-based computer, a distributed computer, a mesh computer, and so on. The computer can run any of a variety of operating systems such as Unix™, Linux™, Windows™, MacOS™, and so on. The control of the data flow by the execution manager can be supported by inserting invalid data 914 into the data 916. When invalid data is detected, execution of the agents in support of the data flow graph can be suspended. Suspending execution of the agents can including halting or suspending the agents and vacating the agents from a reconfigurable fabric which was configured to implement the data flow graph. Since the data flow graph can be reloaded onto the reconfigurable fabric, the states of the agents and the data associated with the agents can be collected. Embodiments include checkpointing a set of buffers for each node within the data flow graph, where the checkpointing is based on a node being paused. Checkpoints that result from the checkpointing can be written 918 into storage 920. The data flow graph that was vacated can be reloaded into the reconfigurable fabric. Further embodiments include restarting a paused data flow graph, wherein the restarting is accomplished by loading a set of checkpointed buffers. The checkpointed buffers can be restored or updated 922 into the reconfigurable fabric.

Execution manager operation can include accessing an interface 930. The interface can include an interface between the host 910 and data flow processor units (DPUs) 940, discussed below. The interface can include a computing device interface such as a peripheral component interconnected express (PCIe or PCI-E) interface. The interface, such as the PCIe interface, can enable transfer of one or more signals such as control signals. The control signals can include fire and done signals for controlling one or more agents; a read weights signal to capture data from agents and buffers associated with agents, such as a variable node or agent, for checkpointing; write and update weights for updating a variable node; a data batch 932 which can include data sent by the execution manager; and so on. Execution manager operation can include one or more data flow processor units 940. The data flow processor units can include one or more reconfigurable fabrics, storage, and so on. The data flow processor units can be configured to implement a data flow graph. Elements or nodes of the data flow graph, such as agents, can be loaded onto the DPUs. The agents can include agent 0 942, which can include an input node, agent 1 944, agent 2 946, agent 3 948, agent 4 950, agent 5 952, and so on. Agent 5 can be a variable node, where a variable node or other nodes can be modified based on machine learning. The variable nodes can contain weights for deep learning. While six agents are shown loaded onto the DPUs, other numbers of agents can be loaded onto the DPUs. The other numbers of agents can be based on the data flow graphs implemented on the DPUs.

In embodiments, variable nodes, such as agent 5 952, can control or regulate the flow of data through a data flow graph, such as in a data flow graph implemented in data flow processor unit(s) 940. A variable node agent can issue N number of multiple copies of a variable for distribution, where N is an integer greater than 1 and less than or equal to the total number of nodes in a data flow graph. The N copies can be issued before the variable node agent stops to wait for an update. The N copies of the variable can be propagated to other agents implemented in other nodes, such as agent 1 944, agent 2 946, agent 3 948, and agent 4 950. Of course, additional agents may reside in additional nodes (not shown). An average of the N updates resulting from the N multiple copies of the variable that were issued can be used for distributed training of a neural network implemented as a data flow graph. In embodiments, two or more sets of N number of copies of the variable can be issued by a variable node and can be in flight in the data flow graph. This enables two or more averages to be used for parallel training of different data for machine learning.

Figure 10:
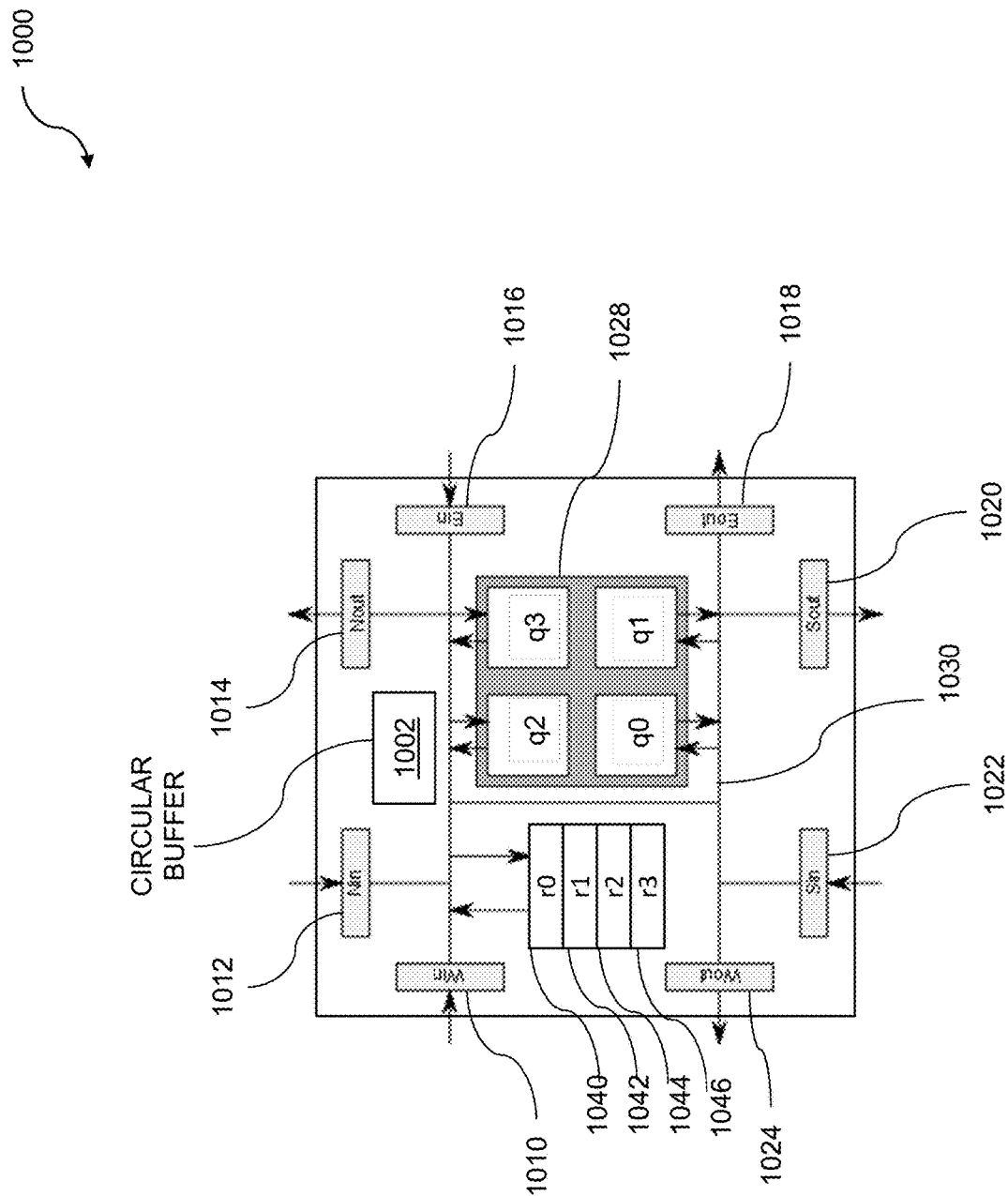
FIG. 10 shows a cluster for coarse-grained reconfigurable processing.

FIG. 10 shows a cluster for coarse-grained reconfigurable processing. The cluster 1000 for coarse-grained reconfigurable processing can be used for a neural network output layer for machine learning. The machine learning can include configuring a plurality of processing elements within a reconfigurable fabric to implement a data flow graph, where the data flow graph implements a neural network. A layer, within the neural network, can be implemented. This layer maps a first vector of real values to a second vector of real values bounded by zero and one where the second vector sums to a value of one using fixed point calculations. Results of the neural network can be classified based on a value of the second vector.

The cluster 1000 comprises a circular buffer 1002. The circular buffer 1002 can be referred to as a main circular buffer or a switch-instruction circular buffer. In some embodiments, the cluster 1000 comprises additional circular buffers corresponding to processing elements within the cluster. The additional circular buffers can be referred to as processor instruction circular buffers. The example cluster 1000 comprises a plurality of logical elements, configurable connections between the logical elements, and a circular buffer 1002 controlling the configurable connections. The logical elements can further comprise one or more of switching elements, processing elements, or storage elements. The example cluster 1000 also comprises four processing elements—q0, q1, q2, and q3. The four processing elements can collectively be referred to as a "quad," and can be jointly indicated by a grey reference box 1028. In embodiments, there is intercommunication among and between each of the four processing elements. In embodiments, the circular buffer 1002 controls the passing of data to the quad of processing elements 1028 through switching elements. In embodiments, the four processing elements 1028 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message transfer via a bus or shared memory interface. Power gating can be applied to one or more processors (e.g. q1) in order to reduce power.

The cluster 1000 can further comprise storage elements coupled to the configurable connections. As shown, the cluster 1000 comprises four storage elements—r0 1040, r1 1042, r2 1044, and r3 1046. The cluster 1000 further comprises a north input (Nin) 1012, a north output (Nout) 1014, an east input (Ein) 1016, an east output (Eout) 1018, a south input (Sin) 1022, a south output (Sout) 1020, a west input (Win) 1010, and a west output (Wout) 1024. The circular buffer 1002 can contain switch instructions that implement configurable connections. For example, an instruction effectively connects the west input 1010 with the north output 1014 and the east output 1018 and this routing is accomplished via bus 1030. The cluster 1000 can further comprise a plurality of circular buffers residing on a semiconductor chip where the plurality of circular buffers controls unique, configurable connections between the logical elements. The storage elements can include instruction random access memory (I-RAM) and data random access memory (D-RAM). The I-RAM and the D-RAM can be quad I-RAM and quad D-RAM, respectively, where the I-RAM and/or the D-RAM supply instructions and/or data, respectively, to the processing quad of a switching element.

A preprocessor or compiler can be configured to prevent data collisions within the circular buffer 1002. The prevention of collisions can be accomplished by inserting no-op or sleep instructions into the circular buffer (pipeline). Alternatively, in order to prevent a collision on an output port, intermediate data can be stored in registers for one or more pipeline cycles before being sent out on the output port. In other situations, the preprocessor can change one switching instruction to another switching instruction to avoid a conflict. For example, in some instances the preprocessor can change an instruction placing data on the west output 1024 to an instruction placing data on the south output 1020, such that the data can be output on both output ports within the same pipeline cycle. In a case where data needs to travel to a cluster that is both south and west of the cluster 1000, it can be more efficient to send the data directly to the south output port rather than to store the data in a register first, and then to send the data to the west output on a subsequent pipeline cycle.

An L2 switch interacts with the instruction set. A switch instruction typically has both a source and a destination. Data is accepted from the source and sent to the destination. There are several sources (e.g. any of the quads within a cluster, any of the L2 directions—North, East, South, West, a switch register, or one of the quad RAMs—data RAM, IRAM, PE/Co Processor Register). As an example, to accept data from any L2 direction, a "valid" bit is used to inform the switch that the data flowing through the fabric is indeed valid. The switch will select the valid data from the set of specified inputs. For this to function properly, only one input can have valid data, and the other inputs must all be marked as invalid. It should be noted that this fan-in operation at the switch inputs operates independently for control and data. There is no requirement for a fan-in mux to select data and control bits from the same input source. Data valid bits are used to select valid data, and control valid bits are used to select the valid control input. There are many sources and destinations for the switching element, which can result in excessive instruction combinations, so the L2 switch has a fan-in function enabling input data to arrive from one and only one input source. The valid input sources are specified by the instruction. Switch instructions are therefore formed by combining a number of fan-in operations and sending the result to a number of specified switch outputs.

In the event of a software error, multiple valid bits may arrive at an input. In this case, the hardware implementation can perform any safe function of the two inputs. For example, the fan-in could implement a logical OR of the input data. Any output data is acceptable because the input condition is an error, so long as no damage is done to the silicon. In the event that a bit is set to '1' for both inputs, an output bit should also be set to '1'. A switch instruction can accept data from any quad or from any neighboring L2 switch. A switch instruction can also accept data from a register or a microDMA controller. If the input is from a register, the register number is specified. Fan-in may not be supported for many registers as only one register can be read in a given cycle. If the input is from a microDMA controller, a DMA protocol is used for addressing the resource.

For many applications, the reconfigurable fabric can be a DMA slave, which enables a host processor to gain direct access to the instruction and data RAMs (and registers) that are located within the quads in the cluster. DMA transfers are initiated by the host processor on a system bus. Several DMA paths can propagate through the fabric in parallel. The DMA paths generally start or finish at a streaming interface to the processor system bus. DMA paths may be horizontal, vertical, or a combination (as determined by a router). To facilitate high bandwidth DMA transfers, several DMA paths can enter the fabric at different times, providing both spatial and temporal multiplexing of DMA channels. Some DMA transfers can be initiated within the fabric, enabling DMA transfers between the block RAMs without external supervision. It is possible for a cluster "A", to initiate a transfer of data between cluster "B" and cluster "C" without any involvement of the processing elements in clusters "B" and "C". Furthermore, cluster "A" can initiate a fan-out transfer of data from cluster "B" to clusters "C", "D", and so on, where each destination cluster writes a copy of the DMA data to different locations within their Quad RAMs. A DMA mechanism may also be used for programming instructions into the instruction RAMs.

Accesses to RAM in different clusters can travel through the same DMA path, but the transactions must be separately defined. A maximum block size for a single DMA transfer can be 8 KB. Accesses to data RAMs can be performed either when the processors are running or while the processors are in a low power "sleep" state. Accesses to the instruction RAMs and the PE and Co-Processor Registers may be performed during configuration mode. The quad RAMs may have a single read/write port with a single address decoder, thus allowing shared access by the quads and the switches. The static scheduler (i.e. the router) determines when a switch is granted access to the RAMs in the cluster. The paths for DMA transfers are formed by the router by placing special DMA instructions into the switches and determining when the switches can access the data RAMs. A microDMA controller within each L2 switch is used to complete data transfers. DMA controller parameters can be programmed using a simple protocol that forms the "header" of each access.

In embodiments, the computations that can be performed on a cluster for coarse-grained reconfigurable processing can be represented by a data flow graph. Data flow processors, data flow processor elements, and the like, are particularly well suited to processing the various nodes of data flow graphs. The data flow graphs can represent communications between and among agents, matrix computations, tensor manipulations, Boolean functions, and so on. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of high quality data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs arranged in configurations such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value of minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0 then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the clusters enter the configuration mode, various techniques, including direct memory access (DMA) can be used to load instructions from the kernel into instruction memories of the PEs. The clusters that were preprogrammed to enter configuration mode can also be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as those based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

A reconfigurable fabric can include quads of elements. The elements of the reconfigurable fabric can include processing elements, switching elements, storage elements, and so on. An element such as a storage element can be controlled by a rotating circular buffer. In embodiments, the rotating circular buffer can be statically scheduled. The data operated on by the agents that are resident within the reconfigurable buffer can include tensors. Tensors can include one or more blocks. The reconfigurable fabric can be configured to process tensors, tensor blocks, tensors and blocks, etc. One technique for processing tensors includes deploying agents in a pipeline. That is, the output of one agent can be directed to the input of another agent. Agents can be assigned to clusters of quads, where the clusters can include one or more quads. Multiple agents can be pipelined when there are sufficient clusters of quads to which the agents can be assigned. Multiple pipelines can be deployed. Pipelining of the multiple agents can reduce the sizes of input buffers, output buffers, intermediate buffers, and other storage elements. Pipelining can further reduce memory bandwidth needs of the reconfigurable fabric.

Agents can be used to support dynamic reconfiguration of the reconfigurable fabric. The agents that support dynamic reconfiguration of the reconfigurable fabric can include interface signals in a control unit. The interface signals can include suspend, agent inputs empty, agent outputs empty, and so on. The suspend signal can be implemented using a variety of techniques such as a semaphore, a streaming input control signal, and the like. When a semaphore is used, the agent that is controlled by the semaphore can monitor the semaphore. In embodiments, a direct memory access (DMA) controller can wake the agent when the setting of the semaphore has been completed. The streaming control signal, if used, can wake a control unit if the control unit is sleeping. A response received from the agent can be configured to interrupt the host software.

The suspend semaphore can be asserted by runtime software in advance of commencing dynamic reconfiguration of the reconfigurable fabric. Upon detection of the semaphore, the agent can begin preparing for entry into a partially resident state. A partially resident state for the agent can include having the agent control unit resident after the agent kernel is removed. The agent can complete processing of any currently active tensor being operated on by the agent. In embodiments, a done signal and a fire signal may be sent to upstream or downstream agents, respectively. A done signal can be sent to the upstream agent to indicate that all data has been removed from its output buffer. A fire signal can be sent to a downstream agent to indicate that data in the output buffer is ready for processing by the downstream agent. The agent can continue to process incoming done signals and fire signals, but will not commence processing of any new tensor data after completion of the current tensor processing by the agent. The semaphore can be reset by the agent to indicate to a host that the agent is ready to be placed into partial residency. In embodiments, having the agent control unit resident after the agent kernel is removed comprises having the agent partially resident. A control unit may not assert one or more signals, nor expect one or more responses from a kernel in the agent, when a semaphore has been reset.

Other signals from an agent can be received by a host. The signals can include an agent inputs empty signal, an agent outputs empty signal, and so on. The agent inputs empty signal can be sent from the agent to the host and can indicate that the input buffers are empty. The agent inputs empty signal can only be sent from the agent when the agent is partially resident. The agent outputs empty signal can be sent from the agent to the host and can indicate that the output buffers are empty. The agent outputs empty signal can only be sent from the agent to the host when the agent is partially resident. When the runtime (host) software receives both signals, agent inputs empty and agent outputs empty, from the partially resident agent, the agent can be swapped out of the reconfigurable fabric and can become fully vacant.

Recall that an agent can be one of a plurality of agents that form a data flow graph. The data flow graph can be based on a plurality of subgraphs. The data flow graph can be based on agents which can support three states of residency: fully resident, partially resident, and fully vacant. A complete subsection (or subgraph) based on the agents that support the three states of residency can be swapped out of the reconfigurable fabric. The swapping out of the subsection can be based on asserting a suspend signal input to an upstream agent. The asserting of the suspend signal can be determined by the runtime software. When a suspend signal is asserted, the agent can stop consuming input data such as an input sensor. The tensor can queue within the input buffers of the agent. The agent kernel can be swapped out of the reconfigurable fabric, leaving the agent partially resident while the agent waits for the downstream agents to drain the output buffers for the agent. When an upstream agent is fully resident, the agent may not be able to fully vacate because a fire signal might be sent to the agent by the upstream agent.

When the upstream agent is partially resident or is fully vacant, then the agent can be fully vacated from the reconfigurable fabric. The agent can be fully vacated if it asserts both the input buffers empty and output buffers empty signals.

Figure 11:
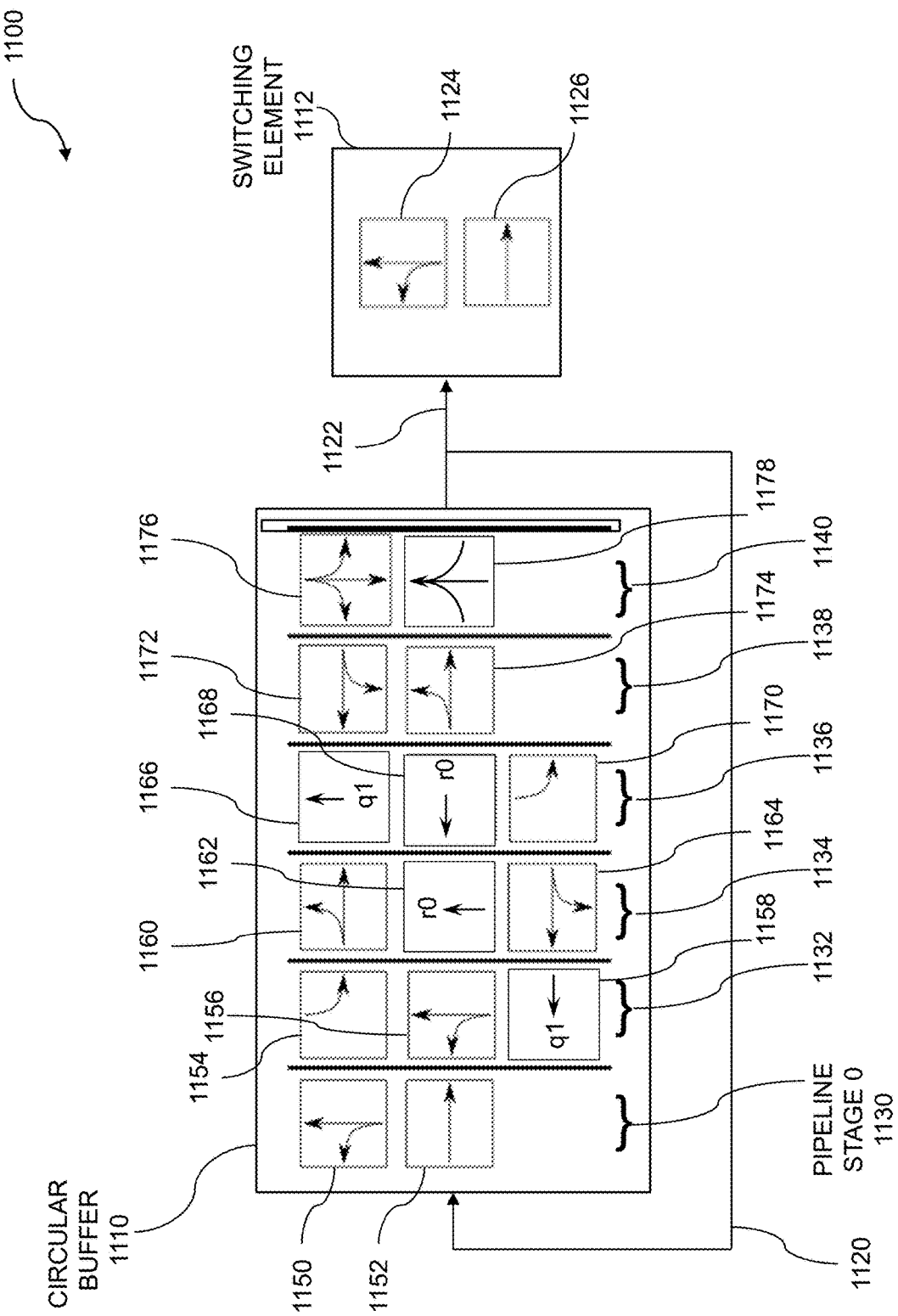
FIG. 11 shows a block diagram of a circular buffer.

FIG. 11 shows a block diagram of a circular buffer. The circular buffer block diagram 1100 can include a switching element 1112 corresponding to the circular buffer. The circular buffer and the corresponding switching element can be used in part for a neural network output layer for machine learning. Using the circular buffer 1110 and the corresponding switching element 1112, data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The block diagram 1100 describes a processor-implemented method for data manipulation. The circular buffer 1110 contains a plurality of pipeline stages. Each pipeline stage contains one or more instructions, up to a maximum instruction depth. In the embodiment shown in FIG. 11, the circular buffer 1110 is a 6×3 circular buffer, meaning that it implements a six-stage pipeline with an instruction depth of up to three instructions per stage (column). Hence, the circular buffer 1110 can include one, two, or three switch instruction entries per column. In some embodiments, the plurality of switch instructions per cycle can comprise two or three switch instructions per cycle. However, in certain embodiments, the circular buffer 1110 supports only a single switch instruction in a given cycle. In the example block diagram 1100 shown, Pipeline Stage 0 1130 has an instruction depth of two instructions 1150 and 1152. Though the remaining pipeline stages 1-5 are not textually labeled in the block diagram 1100, the stages are indicated by callouts 1132, 1134, 1136, 1138, and 1140. Pipeline stage 1 1132 has an instruction depth of three instructions 1154, 1156, and 1158. Pipeline stage 2 1134 has an instruction depth of three instructions 1160, 1162, and 1164. Pipeline stage 3 1136 also has an instruction depth of three instructions 1166, 1168, and 1170. Pipeline stage 4 1138 has an instruction depth of two instructions 1172 and 1174. Pipeline stage 5 1140 has an instruction depth of two instructions 1176 and 1178. In embodiments, the circular buffer 1110 includes 64 columns. During operation, the circular buffer 1110 rotates through configuration instructions. The circular buffer 1110 can dynamically change operation of the logical elements based on the rotation of the circular buffer. The circular buffer 1110 can comprise a plurality of switch instructions per cycle for the configurable connections.

The instruction 1152 is an example of a switch instruction. In embodiments, each cluster has four inputs and four outputs, each designated within the cluster's nomenclature as "north," "east," "south," and "west" respectively. For example, the instruction 1152 in the diagram 1100 is a west-to-east transfer instruction. The instruction 1152 directs the cluster to take data on its west input and send out the data on its east output. In another example of data routing, the instruction 1150 is a fan-out instruction. The instruction 1150 instructs the cluster to take data from its south input and send out on the data through both its north output and its west output. The arrows within each instruction box indicate the source and destination of the data. The instruction 1178 is an example of a fan-in instruction. The instruction 1178 takes data from the west, south, and east inputs and sends out the data on the north output. Therefore, the configurable connections can be considered to be time multiplexed.

In embodiments, the clusters implement multiple storage elements in the form of registers. In the block diagram example 1100 shown, the instruction 1162 is a local storage instruction. The instruction 1162 takes data from the instruction's south input and stores it in a register (r0). Another instruction (not shown) is a retrieval instruction. The retrieval instruction takes data from a register (e.g. r0) and outputs it from the instruction's output (north, south, east, west). Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

The obtaining data from a first switching element and the sending the data to a second switching element can include a direct memory access (DMA). A DMA transfer can continue while valid data is available for the transfer. A DMA transfer can terminate when it has completed without error, or when an error occurs during operation. Typically, a cluster that initiates a DMA transfer will request to be brought out of a sleep state when the transfer is complete. This waking is achieved by setting control signals that can control the one or more switching elements. Once the DMA transfer is initiated with a start instruction, a processing element or switching element in the cluster can execute a sleep instruction to place itself to sleep. When the DMA transfer terminates, the processing elements and/or switching elements in the cluster can be brought out of sleep after the final instruction is executed. Note that if a control bit can be set in the register of the cluster that is operating as a slave in the transfer, that cluster can also be brought out of a sleep state if it is asleep during the transfer.

The cluster that is involved in a DMA and can be brought out of sleep after the DMA terminates can determine that it has been brought out of a sleep state based on the code that is executed. A cluster can be brought out of a sleep state based on the arrival of a reset signal and the execution of a reset instruction. The cluster can be brought out of a sleep state by the arrival of valid data (or control) following the execution of a switch instruction. A processing element or switching element can determine why it was brought out of a sleep state by the context of the code that the element starts to execute. A cluster can be awoken during a DMA operation by the arrival of valid data. The DMA instruction can be executed while the cluster remains asleep and awaits the arrival of valid data. Upon arrival of the valid data, the cluster is woken and the data is stored. Accesses to one or more data random access memories (RAMs) can be performed when the processing elements and the switching elements are operating. The accesses to the data RAMs can also be performed while the processing elements and/or switching elements are in a low power sleep state.

In embodiments, the clusters implement multiple processing elements in the form of processor cores, referred to as cores q0, q1, q2, and q3. In embodiments, four cores are used, though any number of cores can be implemented. The instruction 1158 is a processing instruction. The instruction 1158 takes data from the instruction's east input and sends it to a processor q1 for processing. The processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the block diagram example 1100 shown, the circular buffer 1110 rotates instructions in each pipeline stage into switching element 1112 via a forward data path 1122, and also back to a pipeline stage 0 1130 via a feedback data path 1120. Instructions can include switching instructions, storage instructions, and processing instructions, among others. The feedback data path 1120 can allow instructions within the switching element 1112 to be transferred back to the circular buffer. Hence, the instructions 1124 and 1126 in the switching element 1112 can also be transferred back to pipeline stage 0 as the instructions 1150 and 1152. In addition to the instructions depicted on FIG. 11, a no-op instruction can also be inserted into a pipeline stage. In embodiments, a no-op instruction causes execution to not be performed for a given cycle. In effect, the introduction of a no-op instruction can cause a column within the circular buffer 1110 to be skipped in a cycle. In contrast, not skipping an operation indicates that a valid instruction is being pointed to in the circular buffer. A sleep state can be accomplished by not applying a clock to a circuit, performing no processing within a processor, removing a power supply voltage or bringing a power supply to ground, storing information into a non-volatile memory for future use and then removing power applied to the memory, or by similar techniques. A sleep instruction that causes no execution to be performed until a predetermined event occurs which causes the logical element to exit the sleep state can also be explicitly specified. The predetermined event can be the arrival or availability of valid data. The data can be determined to be valid using null convention logic (NCL). In embodiments, only valid data can flow through the switching elements and invalid data points (Xs) are not propagated by instructions.

In some embodiments, the sleep state is exited based on an instruction applied to a switching fabric. The sleep state can, in some embodiments, only be exited by a stimulus external to the logical element and not based on the programming of the logical element. The external stimulus can include an input signal, which in turn can cause a wake up or an interrupt service request to execute on one or more of the logical elements. An example of such a wake-up request can be seen in the instruction 1158, assuming that the processor q1 was previously in a sleep state. In embodiments, when the instruction 1158 takes valid data from the east input and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 1166. In the case of the instruction 1166, data from the processor q1 is moved to the north output. In some embodiments, if Xs have been placed into the processor q1, such as during the instruction 1158, then Xs would be retrieved from the processor q1 during the execution of the instruction 1166 and would be applied to the north output of the instruction 1166.

A collision occurs if multiple instructions route data to a particular port in a given pipeline stage. For example, if instructions 1152 and 1154 are in the same pipeline stage, they will both send data to the east output at the same time, thus causing a collision since neither instruction is part of a time-multiplexed fan-in instruction (such as the instruction 1178). To avoid potential collisions, certain embodiments use preprocessing, such as by a compiler, to arrange the instructions in such a way that there are no collisions when the instructions are loaded into the circular buffer. Thus, the circular buffer 1110 can be statically scheduled in order to prevent data collisions. Thus, in embodiments, the circular buffers are statically scheduled. In embodiments, when the preprocessor detects a data collision, the scheduler changes the order of the instructions to prevent the collision. Alternatively, or additionally, the preprocessor can insert further instructions such as storage instructions (e.g. the instruction 1162), sleep instructions, or no-op instructions, to prevent the collision. Alternatively, or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Returning to DMA, a channel configured as a DMA channel requires a flow control mechanism that is different from regular data channels. A DMA controller can be included in interfaces to master DMA transfer through the processing elements and switching elements. For example, if a read request is made to a channel configured as DMA, the Read transfer is mastered by the DMA controller in the interface. It includes a credit count that keeps track of the number of records in a transmit (Tx) FIFO that are known to be available. The credit count is initialized based on the size of the Tx FIFO. When a data record is removed from the Tx FIFO, the credit count is increased. If the credit count is positive, and the DMA transfer is not complete, an empty data record can be inserted into a receive (Rx) FIFO. The memory bit is set to indicate that the data record should be populated with data by the source cluster. If the credit count is zero (meaning the Tx FIFO is full), no records are entered into the Rx FIFO. The FIFO to fabric block will make sure the memory bit is reset to 0 which thereby prevents a microDMA controller in the source cluster from sending more data.

Each slave interface manages four interfaces between the FIFOs and the fabric. Each interface can contain up to 15 data channels. Therefore, a slave should manage read/write queues for up to 60 channels. Each channel can be programmed to be a DMA channel, or a streaming data channel. DMA channels are managed using a DMA protocol. Streaming data channels are expected to maintain their own form of flow control using the status of the Rx FIFOs (obtained using a query mechanism). Read requests to slave interfaces use one of the flow control mechanisms described previously.

Figure 12:
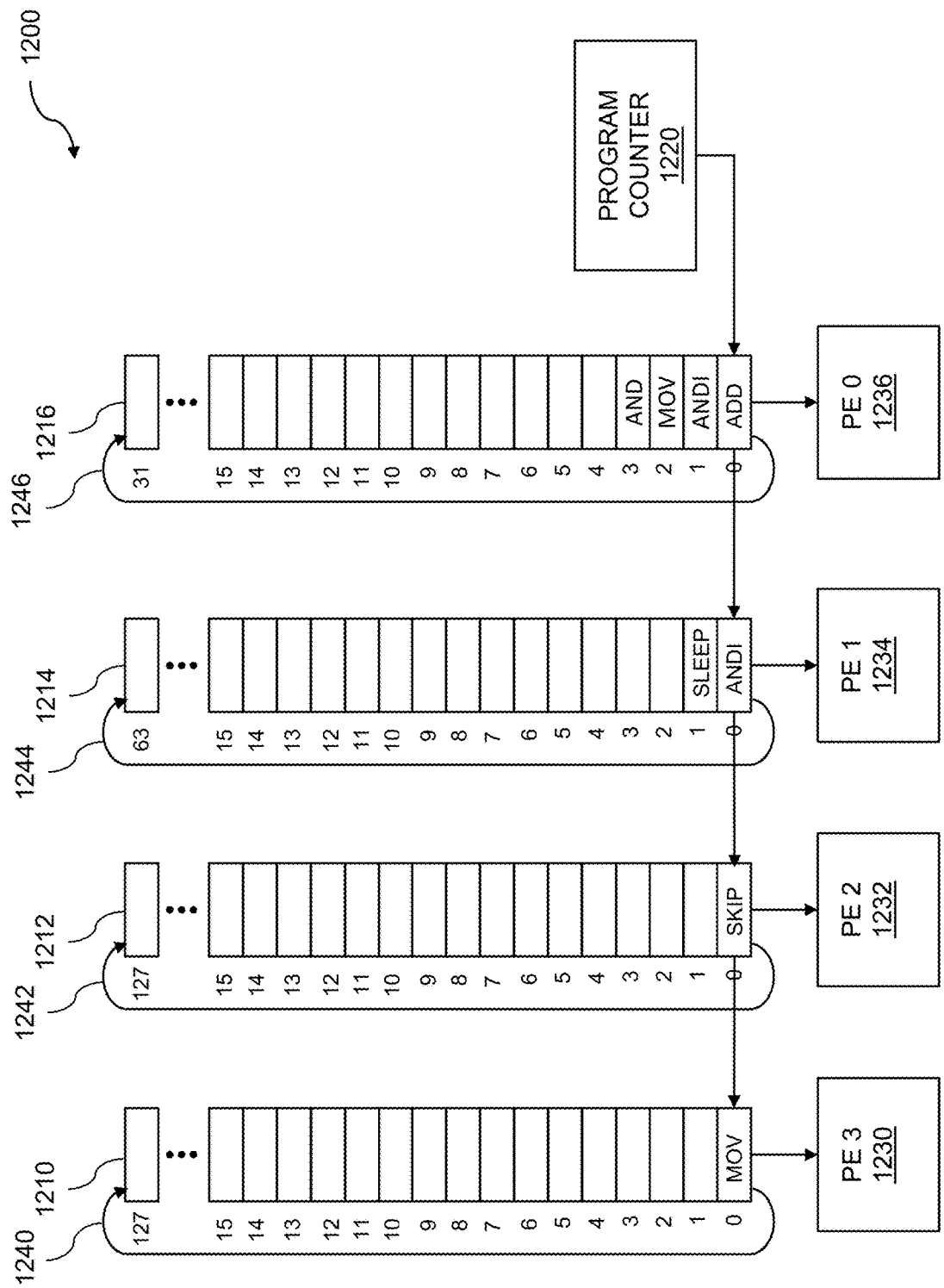
FIG. 12 illustrates circular buffers and processing elements.

FIG. 12 illustrates circular buffers and processing elements. A diagram 1200 indicates example instruction execution for processing elements. The processing elements can include a portion of or all of the elements within a reconfigurable fabric. The instruction execution can include instructions for a neural network output layer for machine learning. A circular buffer 1210 feeds a processing element 1230. A second circular buffer 1212 feeds another processing element 1232. A third circular buffer 1214 feeds another processing element 1234. A fourth circular buffer 1216 feeds another processing element 1236. The four processing elements 1230, 1232, 1234, and 1236 can represent a quad of processing elements. In embodiments, the processing elements 1230, 1232, 1234, and 1236 are controlled by instructions received from the circular buffers 1210, 1212, 1214, and 1216. The circular buffers can be implemented using feedback paths 1240, 1242, 1244, and 1246, respectively. In embodiments, the circular buffer can control the passing of data to a quad of processing elements through switching elements, where each of the quad of processing elements is controlled by four other circular buffers (as shown in the circular buffers 1210, 1212, 1214, and 1216) and where data is passed back through the switching elements from the quad of processing elements where the switching elements are again controlled by the main circular buffer. In embodiments, a program counter 1220 is configured to point to the current instruction within a circular buffer. In embodiments with a configured program counter, the contents of the circular buffer are not shifted or copied to new locations on each instruction cycle. Rather, the program counter 1220 is incremented in each cycle to point to a new location in the circular buffer. The circular buffers 1210, 1212, 1214, and 1216 can contain instructions for the processing elements. The instructions can include, but are not limited to, move instructions, skip instructions, logical AND instructions, logical AND-Invert (i.e. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction and the instruction in the circular buffer can be ignored and the corresponding operation not performed.

The plurality of circular buffers can have differing lengths. That is, the plurality of circular buffers can comprise circular buffers of differing sizes. In embodiments, the first two circular buffers 1210 and 1212 have a length of 128 instructions, the third circular buffer 1214 has a length of 64 instructions, and the fourth circular buffer 1216 has a length of 32 instructions, but other circular buffer lengths are also possible, and in some embodiments, all buffers have the same length. The plurality of circular buffers that have differing lengths can resynchronize with a zeroth pipeline stage for each of the plurality of circular buffers. The circular buffers of differing sizes can restart at a same time step. In other embodiments, the plurality of circular buffers includes a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not yet completed its operations. When the second circular buffer reaches completion of its loop of operations, the second circular buffer can restart operations from its beginning.

As can be seen in FIG. 12, different circular buffers can have different instruction sets within them. For example, the first circular buffer 1210 contains a MOV instruction. The second circular buffer 1212 contains a SKIP instruction. The third circular buffer 1214 contains a SLEEP instruction and an ANDI instruction. The fourth circular buffer 1216 contains an AND instruction, a MOVE instruction, an ANDI instruction, and an ADD instruction. The operations performed by the processing elements 1230, 1232, 1234, and 1236 are dynamic and can change over time, based on the instructions loaded into the respective circular buffers. As the circular buffers rotate, new instructions can be executed by the respective processing element.

Figure 13:
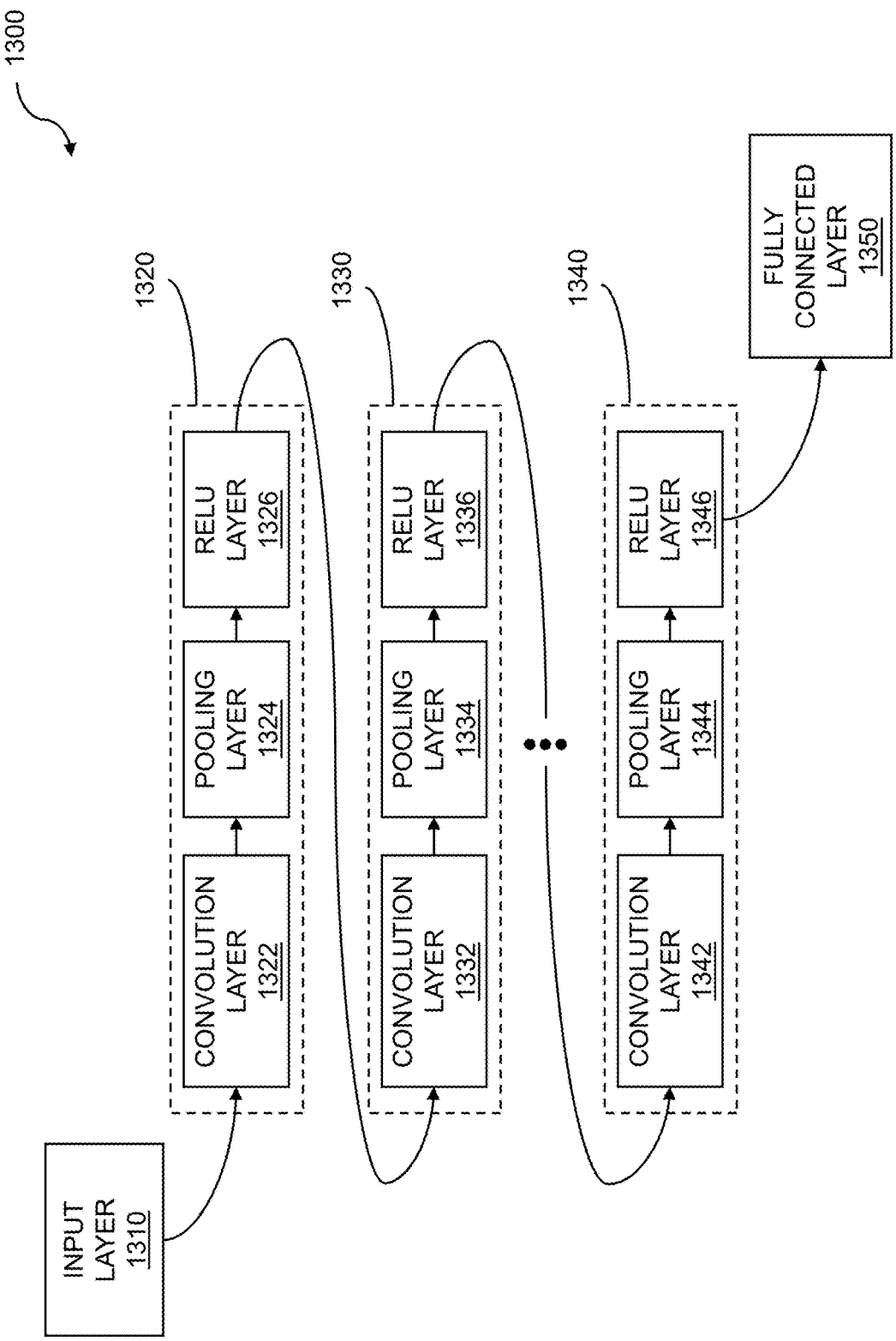
FIG. 13 shows a deep learning block diagram.

FIG. 13 shows a deep learning block diagram. The deep learning block diagram 1300 can include a neural network such as a deep neural network (DNN), a convolutional neural network (CNN), and so on. A convolutional neural network can be based on layers, where the layers can include input layers, output layers, fully connected layers, convolution layers, pooling layers, rectified linear unit (ReLU) layers, and so on. The layers of the convolutional network can be implemented using a reconfigurable fabric. The reconfigurable fabric can include processing elements, switching elements, storage elements, etc. The reconfigurable fabric can be used to perform various operations such as logical operations. Deep learning can include a neural network output layer for machine learning.

A deep learning block diagram 1300 is shown. The block diagram can include various layers, where the layers can include an input layer, hidden layers, a fully connected layer, and so on. In some embodiments, the deep learning block diagram can include a classification layer. The input layer 1310 can receive input data, where the input data can include a first collected data group, a second collected data group, a third collected data group, a fourth collected data group, etc. The collecting of the data groups can be performed in a first locality, a second locality, a third locality, a fourth locality, and so on, respectively. The input layer can then perform processing such as partitioning collected data into non-overlapping partitions. The deep learning block diagram 1300, which can represent a network such as a convolutional neural network, can contain a plurality of hidden layers. While three hidden layers, hidden layer 1320, hidden layer 1330, and hidden layer 1340 are shown, other numbers of hidden layers may be present. Each hidden layer can include layers that perform various operations, where the various layers can include a convolution layer, a pooling layer, and a rectifier layer such as a rectified linear unit (ReLU) layer. Thus, layer 1320 can include convolution layer 1322, pooling layer 1324, and ReLU layer 1326; layer 1330 can include convolution layer 1332, pooling layer 1334, and ReLU layer 1336; and layer 1340 can include convolution layer 1342, pooling layer 1344, and ReLU layer 1346. The convolution layers 1322, 1332, and 1342 can perform convolution operations; the pooling layers 1324, 1334, and 1344 can perform pooling operations, including max pooling, such as data down-sampling; and the ReLU layers 1326, 1336, and 1346 can perform rectification operations. A convolutional layer can reduce the amount of data feeding into a fully connected layer. The deep learning block diagram 1300 can include a fully connected layer 1350. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs configured in arrangements such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0 then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed into configuration mode can be preprogrammed to exit configuration mode. When configuration mode has been exited, execution of the one or more kernels loaded onto the clusters can commence.

Data flow processes that can be executed by data flow processor can be managed by a software stack. A software stack can include a set of subsystems, including software subsystems, which may be needed to create a software platform. The software platform can include a complete software platform. A complete software platform can include a set of software subsystems required to support one or more applications. A software stack can include offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 14:
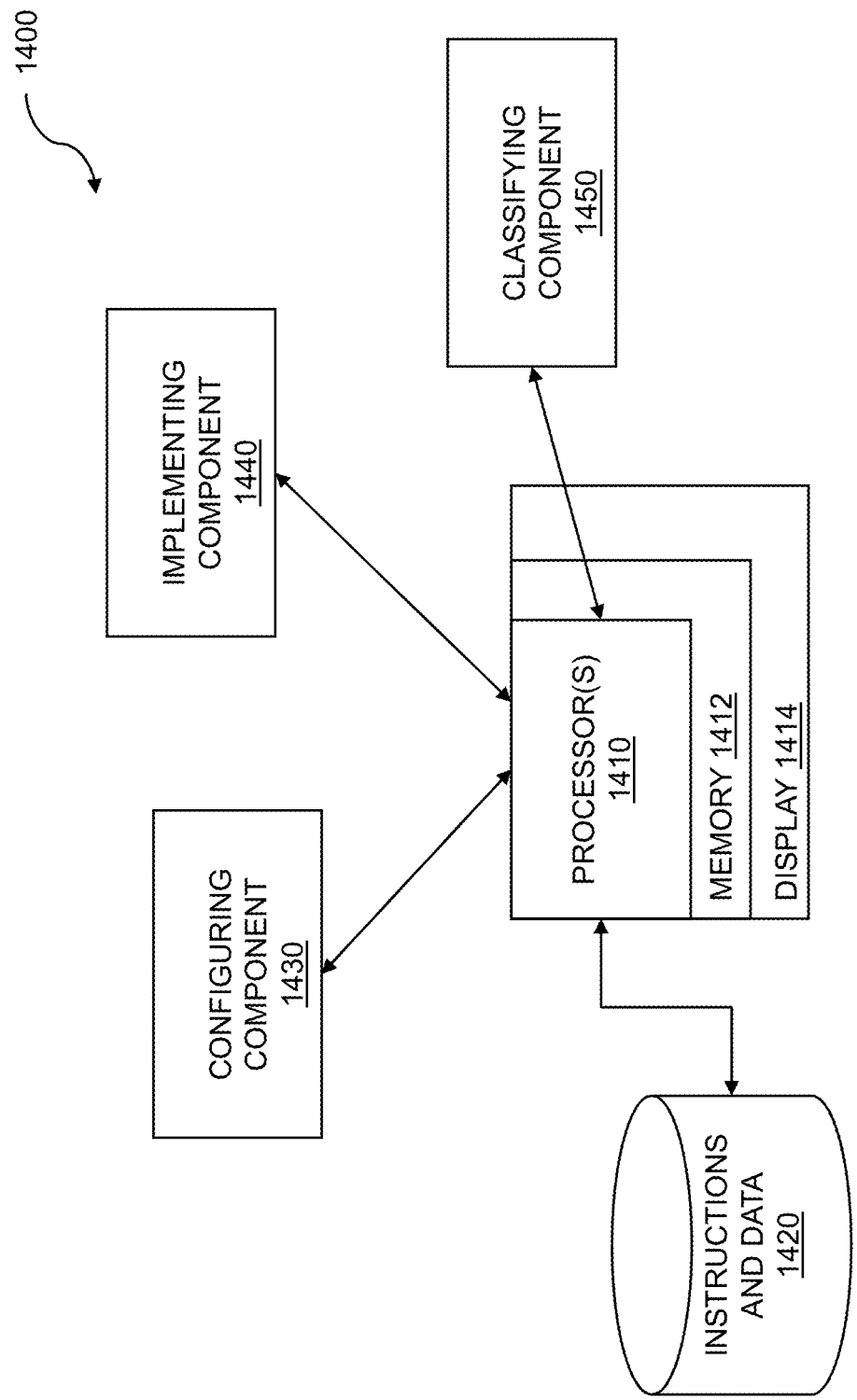
FIG. 14 is a system for a neural network output layer for machine learning.

FIG. 14 is a system for a neural network output layer for machine learning. The system 1400 can include one or more processors 1410 coupled to a memory 1412 which stores instructions. The system 1400 can include a display 1414 coupled to the one or more processors 1410 for displaying data, intermediate steps, instructions, and so on. In embodiments, one or more processors 1410 are coupled to the memory 1412 where the one or more processors, when executing the instructions which are stored, are configured to: configure a plurality of processing elements within a reconfigurable fabric to implement a data flow graph, wherein the data flow graph implements a neural network; implement a layer, within the neural network, that maps a first vector of real values to a second vector of real values bounded by zero and one wherein the second vector sums to a value of one using fixed point calculations; and classify results of the neural network based on a value of the second vector.

The system 1400 can include a collection of instructions and data 1420. The instructions and data 1420 may be stored in a database, one or more statically linked libraries, one or more dynamically linked libraries, precompiled headers, source code, flow graphs, kernels, agents, or other suitable formats. The instructions can include instructions for a neural network output layer for machine learning. The data can include unstructured data, matrices, tensors, and layers and weights that can be associated with a neural network such as a convolutional neural network, a recurrent neural network, etc. The instructions can include a static schedule for controlling one or more rotating circular buffers. The system 1400 can include a configuring component 1430. The configuring component 1430 can include functions, instructions, or code for configuring a plurality of processing elements within a reconfigurable fabric to implement a data flow graph. The data flow graph implements a neural network. In embodiments, the neural network can include a convolutional neural network, a recurrent neural network, and the like. The data flow graph can include machine learning or deep learning. The plurality of processing elements that is configured can include clusters of processing elements. The clusters on the reconfigurable fabric can include quads of elements such as processing elements. The reconfigurable fabric can further include other elements such as storage elements, switching elements, and the like.

The system 1400 can include an implementing component 1440. The implementing component can include functions and instructions for implementing a layer, within the neural network, that maps a first vector of real values to a second vector of real values bounded by zero and one where the second vector sums to a value of one using fixed point calculations. The layer can include a final layer within the neural network. The layer, such as the final layer or output layer for the neural network, can perform an operation for the data flow graph. In embodiments, the layer that maps the first vector comprises a Softmax function. Other functions or operations can also be performed. In other embodiments, the layer is based on a parabolic estimator function, where the parabolic estimator function is implemented using lookup tables. The system 1400 can include a classifying component 1450. The classifying component 1450 can include functions and instructions for classifying results of the neural network based on a value of the second vector. The classifying, which seeks to apply rules to data to predict whether the data such as a vector is a member of a group, can be used for a variety of purposes. In embodiments, classifying can be part of a machine learning process or a deep learning process. The classifying can be used to train a data flow graph, neural network, etc., that represents the machine learning or the deep learning process.

The system 1400 can include a computer program product embodied in a non-transitory computer readable medium for data manipulation, the computer program product comprising code which causes one or more processors to perform operations of: configuring a plurality of processing elements within a reconfigurable fabric to implement a data flow graph, wherein the data flow graph implements a neural network; implementing a layer, within the neural network, that maps a first vector of real values to a second vector of real values bounded by zero and one wherein the second vector sums to a value of one using fixed point calculations; and classifying results of the neural network based on a value of the second vector.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc;

an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data manipulation comprising:
   configuring a plurality of processing elements within a reconfigurable fabric to implement a data flow graph, wherein the data flow graph implements a neural network;
   implementing a layer, based on a parabolic estimator function, within the neural network, that maps a first vector of real values to a second vector of real values bounded by zero and one wherein the second vector sums to a value of one using fixed point calculations; and
   classifying results of the neural network based on a value of the second vector.

2. The method of claim 1 wherein the layer is a final layer within the neural network.

3. The method of claim 1 wherein the layer that maps the first vector comprises a Softmax function.

4. The method of claim 3 wherein the layer that maps the first vector is an output layer for the neural network.

5. A processor-implemented method for data manipulation comprising:
   configuring a plurality of processing elements within a reconfigurable fabric to implement a data flow graph, wherein the data flow graph implements a neural network;
   implementing a layer, within the neural network, that maps a first vector of real values to a second vector of real values bounded by zero and one wherein the second vector sums to a value of one using fixed point calculations; and
   classifying results of the neural network based on a value of the second vector;
   wherein the layer that maps the first vector comprises a Softmax function,
   the layer that maps the first vector is an output layer for the neural network; and
   the layer is based on a parabolic estimator function.

6. A processor-implemented method for data manipulation comprising:
   configuring a plurality of processing elements within a reconfigurable fabric to implement a data flow graph, wherein the data flow graph implements a neural network;
   implementing a layer, within the neural network, that maps a first vector of real values to a second vector of real values bounded by zero and one wherein the second vector sums to a value of one using fixed point calculations; and
   classifying results of the neural network based on a value of the second vector;
   wherein the layer that maps the first vector comprises a Softmax function,
   the layer that maps the first vector is an output layer for the neural network,
   the layer is based on a parabolic estimator function; and
   the parabolic estimator function is implemented using lookup tables.

7. A processor-implemented method for data manipulation comprising:
   configuring a plurality of processing elements within a reconfigurable fabric to implement a data flow graph, wherein the data flow graph implements a neural network;
   implementing a layer, within the neural network, that maps a first vector of real values to a second vector of real values bounded by zero and one wherein the second vector sums to a value of one using fixed point calculations; and
   classifying results of the neural network based on a value of the second vector;
   wherein the layer that maps the first vector comprises a Softmax function,
   the layer that maps the first vector is an output layer for the neural network, the layer is based on a parabolic estimator function;
the parabolic estimator function is implemented using lookup tables; and
the lookup tables comprise three lookup tables.

8. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;
wherein the layer that maps the first vector comprises a Softmax function,
the layer that maps the first vector is an output layer for the neural network,
the layer is based on a parabolic estimator function;
the parabolic estimator function is implemented using lookup tables;
the lookup tables comprise three lookup tables; and
further comprising two multiplex per element of an output vector.

9. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;
wherein the layer that maps the first vector comprises a Softmax function,
the layer that maps the first vector is an output layer for the neural network,
the layer is based on a parabolic estimator function;
the parabolic estimator function is implemented using lookup tables;
the lookup tables comprise three lookup tables;
further comprising two multiplex per element of an output vector; and
no more than three multipliers per element of an output vector are used.

10. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;
wherein the layer that maps the first vector comprises a Softmax function,
the layer that maps the first vector is an output layer for the neural network,
the layer is based on a parabolic estimator function;
the parabolic estimator function is implemented using lookup tables;
the lookup tables comprise three lookup tables; and
the three lookup tables are each 256 elements or fewer in length.

11. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;
wherein the layer that maps the first vector comprises a Softmax function,
the layer that maps the first vector is an output layer for the neural network,
the layer is based on a parabolic estimator function;
the parabolic estimator function is implemented using lookup tables; and
the lookup tables comprise equidistant points.

12. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;
wherein the layer that maps the first vector comprises a Softmax function,
the layer that maps the first vector is an output layer for the neural network,
the layer is based on a parabolic estimator function;
the parabolic estimator function is implemented using lookup tables;
the lookup tables comprise equidistant points; and
values between two equidistant points with a lookup table correspond to an integer number of intervals between the two points.

13. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;

wherein the layer that maps the first vector comprises a Softmax function,
the layer that maps the first vector is an output layer for the neural network,
the layer is based on a parabolic estimator function;
the parabolic estimator function is implemented using lookup tables;
the lookup tables comprise equidistant points;
values between two equidistant points with a lookup table correspond to an integer number of intervals between the two points; and
the integer number of intervals is based on a power of two.

14. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;
wherein the layer that maps the first vector comprises a Softmax function,
the layer that maps the first vector is an output layer for the neural network;
the layer is based on a parabolic estimator function; and
the parabolic estimator function is implemented using one lookup table.

15. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;
wherein the layer that maps the first vector comprises a Softmax function,
the layer that maps the first vector is an output layer for the neural network;
the layer is based on a parabolic estimator function; and
the parabolic estimator function is based on a moving set of three points.

16. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;
wherein the layer that maps the first vector comprises a Softmax function,
the layer that maps the first vector is an output layer for the neural network;
the layer is based on a parabolic estimator function; and
the parabolic estimator function implements $e^{X_i}$ or $k^{X_i}$ for the layer, where Xi are arguments of the Softmax function, k is a real number greater than 1, and e is the natural logarithm base.

17. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;
wherein the layer that maps the first vector comprises a Softmax function,
the layer that maps the first vector is an output layer for the neural network;
the layer is based on a parabolic estimator function;
the parabolic estimator function implements $e^{X_i}$ or $k^{X_i}$ for the layer, where Xi are arguments of the Softmax function, k is a real number greater than 1, and e is the natural logarithm base; and
$k^{X_i}$ is calculated using 16-bit fixed-point arithmetic.

18. A processor-implemented method for data manipulation comprising:
configuring a plurality of processing elements within a reconfigurable fabric to implement a data flow graph, wherein the data flow graph implements a neural network;
implementing a layer, within the neural network, that maps a first vector of real values to a second vector of real values bounded by zero and one wherein the second vector sums to a value of one using fixed point calculations; and
classifying results of the neural network based on a value of the second vector;
wherein the layer that maps the first vector comprises a Softmax function,
the layer that maps the first vector is an output layer for the neural network;
the layer is based on a parabolic estimator function;
the parabolic estimator function implements $e^{X_i}$ or $k^{X_i}$ for the layer, where Xi are arguments of the Softmax function, k is a real number greater than 1, and e is the natural logarithm base; and
k is equal to 2.

19. The method of claim 1 further comprising using 16-bit fixed-point arithmetic for training passes.

20. The method of claim 6 wherein lookup table entries are calculated offline.

21. A computer program product embodied in a non-transitory computer readable medium for data manipulation, the computer program product comprising code which causes one or more processors to perform operations of:
configuring a plurality of processing elements within a reconfigurable fabric to implement a data flow graph, wherein the data flow graph implements a neural network;
implementing a layer, based on a parabolic estimator function, within the neural network, that maps a first vector of real values to a second vector of real values bounded by zero and one wherein the second vector sums of one using fixed point calculations; and classifying results of the neural network based on a value of the second vector.

22. A computer system for data manipulation comprising:
a memory which stores instructions;
one or more processors coupled to the memory wherein the one or more processors, when executing the instructions which are stored, are configured to
configure a plurality of processing elements within a reconfigurable fabric to implement a data flow graph, wherein the data flow graph implements a neural network;
implement a layer, based on a parabolic estimator function,
within the neural network, that maps a first vector of real values to a second vector of real values bounded by zero and one wherein the second vector sums to a value of one using fixed point calculations; and
    classify results of the neural network based on a value of the second vector.

\* \* \* \* \*